Dec. 24, 1968

R. E. MORGAN ET AL 3,418,558

SINGLE AND BIDIRECTIONAL POWER FLOW SOLID
STATE ELECTRIC POWER CIRCUITS AND
COMMUTATION CIRCUIT THEREFOR

Filed Aug. 3, 1964

Inventors:
Raymond E. Morgan,
William McMurray,
by Paul A. Frank
Their Attorney.

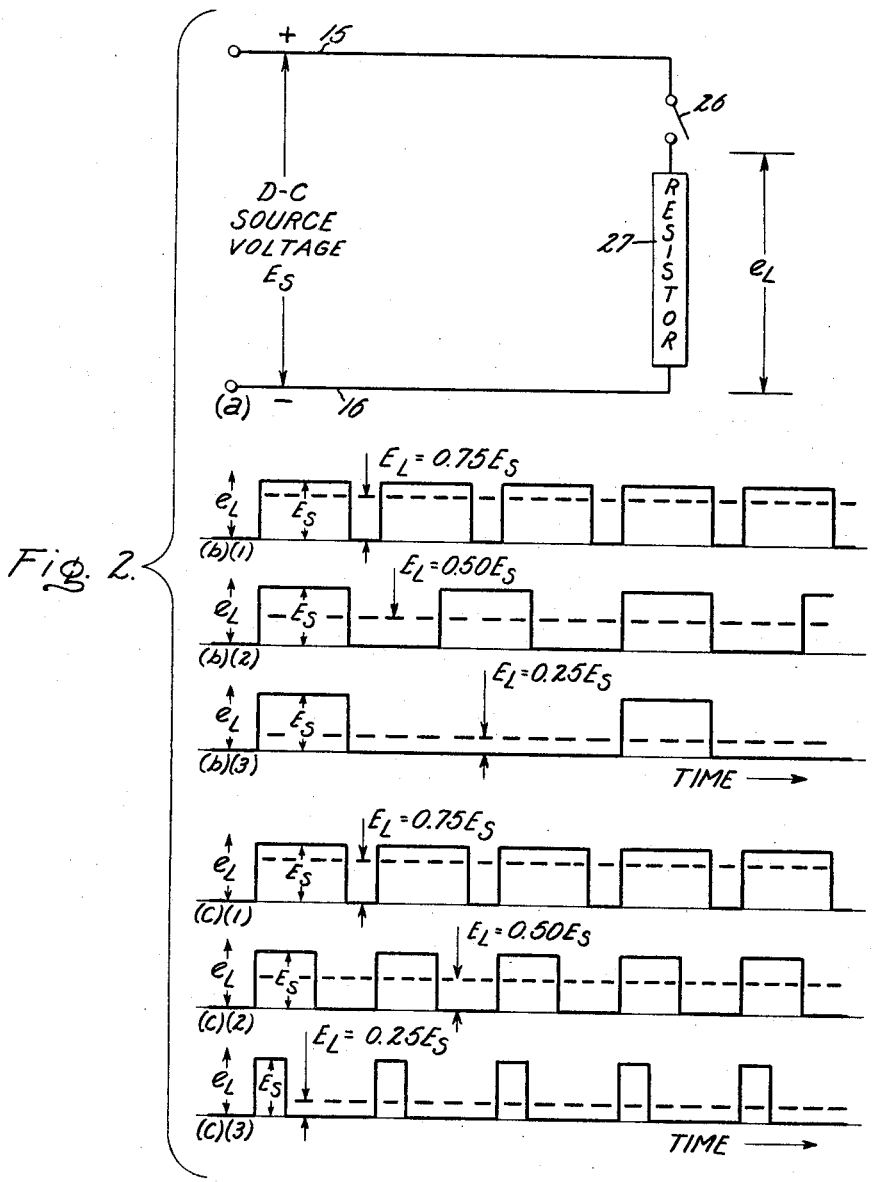

Inventors:
Raymond E. Morgan,
William McMurray,
by Paul A. Frank
Their Attorney.

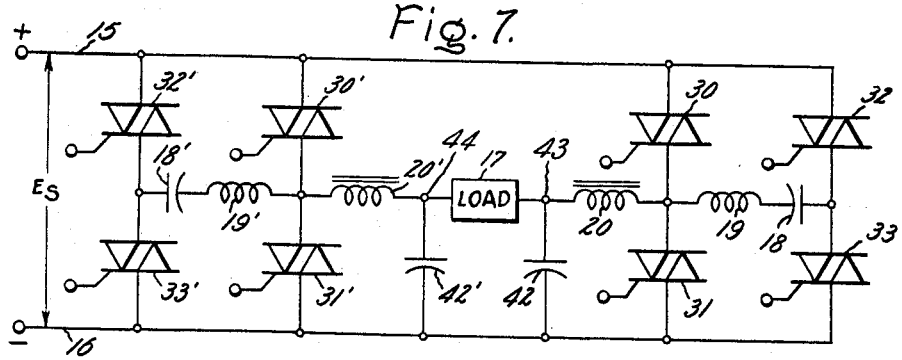
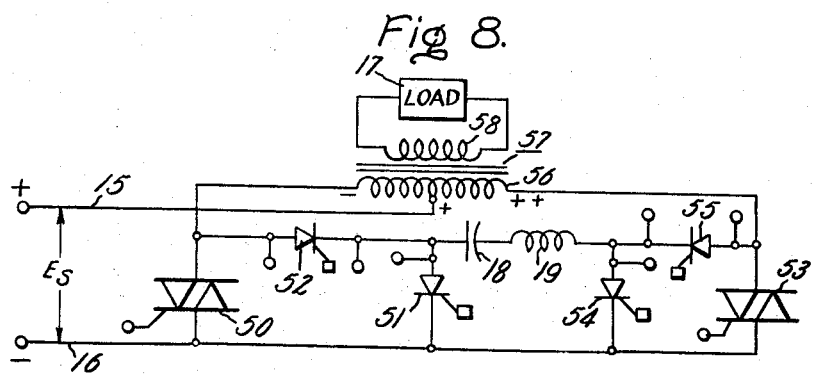
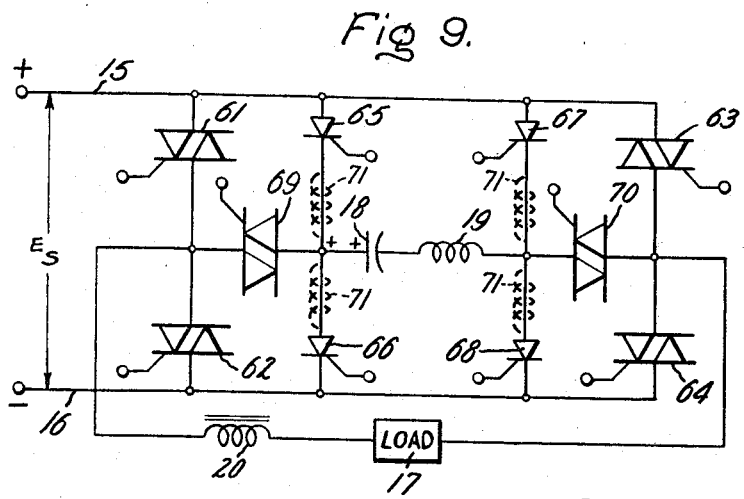

Inventors:
Raymond E. Morgan,
William McMurray
by Paul A. Frank
Their Attorney.

Inventors:
Raymond E. Morgan,
William McMurray.
by Paul A. Frank
Their Attorney.

Inventors:
Raymond E. Morgan,
William McMurray,
by Paul A. Frank
Their Attorney.

Inventors:
Raymond E. Morgan,
William McMurray,
by Paul A. Frank
Their Attorney.

Inventors:
Raymond E. Morgan,
William McMurray,
by Paul A. Frank
Their Attorney.

United States Patent Office 3,418,558
Patented Dec. 24, 1968

3,418,558
SINGLE AND BIDIRECTIONAL POWER FLOW SOLID STATE ELECTRIC POWER CIRCUITS AND COMMUTATION CIRCUIT THEREFOR
Raymond E. Morgan and William McMurray, Schenectady, N.Y., assignors to General Electric Company, a corporation of New York
Filed Aug. 3, 1964, Ser. No. 386,859
26 Claims. (Cl. 321—43)

ABSTRACT OF THE DISCLOSURE

A family of improved power circuits using turn-on, nongate turn-off controlled conducting devices. The load current carrying part of the circuit includes a pair of controlled conducting devices connected in series circuit relationship across a pair of power supply terminals which are adapted to be connected across a source of relatively constant electric potential. A commutation circuit for turning off the load current carrying devices comprises an inductor, capacitor, and turn-on, nongate turn-off controlled conducting device connected in series circuit relationship across at least one of the load current carrying devices. Upon rendering the load current carrying devices conductive during selected time intervals, a desired value electric current is supplied to a load circuit connected across one of this pair of devices.

Our invention relates to a family of new and improved power circuits employing new controlled turn-on conducting devices and a new and improved turn-off or commutation means therefor.

More particularly, our invention relates to a family of power circuits employing turn-on, nongate turn-off solid state semiconductor controlled conducting devices for power switching purposes, and is especially useful in time-ratio control of direct current electric power or for inversion of direct current electric power to alternating current electric power. Time-ratio control of direct current electric power refers to the interruption or chopping-up of a direct current electric potential by controlling the "on" time of a turn-on, turn-off power switching device connected in circuit relationship with a load and the direct current electric potential. Inversion of direct current electric power to alternating current electric power refers to the switching of a load across alternate output terminals of a direct current electric supply by appropriately switching turn-on, turn-off power switching devices connecting the load in circuit relationship with the direct current electric supply. Although there are a number of known time-ratio control and inverter circuits, and many of these are satisfactory for some applications, they in general, have a number of limitations inherent in their design which render them impractical for use in many situations due to their inefficiency, or their inability to supply a required amount of power at a desired operating frequency, or their poor regulation, or because of the physical characteristics of the elements out of which they are constructed.

In recent years, the turn-on, turn-off power switching devices employed in the above described types of power circuits for the most part have employed a solid state semiconductor device known as a silicon controlled rectifier (SCR). The SCR is a four-layer PNPN junction device having a gating electrode which is capable of turning on current flow through the device with only a relatively small gating signal. The conventional SCR, however, is a nongate turn-off device in that once conduction through the device is initiated, the gate thereafter loses control over conduction through the device until it has been switched off by suitable external means. Such external means are generally referred to as commutation circuits and usually effect commutation or turning off of the SCR by reversal of the potential across the SCR or reducing the current flow therethrough below a current known as the holding current. In addition to the SCR, recent advances in the semiconductor art have made available to industry new solid state semiconductor devices which are not only controlled turn-on, nongate turn-off conducting devices, but are also bidirectional conducting devices. A bidirectional conducting device is a device capable of conducting electric current in either direction through the device. A first of these bidirectional devices, referred to as a "triac," is a gate controlled turn-on NPNPN junction device which, similar to the SCR, is a nongate turn-off device that must be turned off by external commutation circuit means. While the preferred form of a triac is a five-layer gate controlled device, it should be noted that four-layer PNPN and NPNP junction gate controlled triac devices are practical, as well as other variations but the triac characteristics mentioned above are common to all. A second newly available power device, referred to as a "power diac" is a two-terminal, five-layer NPNPN junction device which, like the triac, has bidirectional conducting characteristics. In contrast to the SCR and triac, however, the diac is not a gate turn-on device, but must be turned on or fired by the application of a turn-on voltage pulse which for certain devices should have a relatively steep wavefront so that it has a high $dv/dt$ applied across its terminals. It should be noted that the SCR and triac may also be fired by a high $dv/dt$ technique. However, the diac is similar to the SCR and triac in that it too must be turned off by external circuit commutation means. Our invention provides new and improved power circuits employing solid state semiconductor devices of the above general type as well as new and improved commutation scheme for use with such devices.

It is, therefore, a primary object of our invention to provide an entire family of new and improved power circuits employing controlled turn-on, nongate turn-off conducting devices.

Another object of our invention is to provide new and improved power circuits of the above type which are capable of providing any desired power output over a limited but wide range of power levels, and at operating frequencies likewise extending over a wide range of values.

A further object of our invention is to provide a family of new and improved power circuits having the above set forth characteristics which are highly efficient in operation, and possess good regulation.

Another object of our invention is to provide a new and improved commutation scheme for power circuits employing controlled turn-on, nongate turn-off conducting devices which allows for a reduction in the size and number of components employed in the circuit for a given power rating and, hence, is economical to manufacture.

A still further object of our invention is to provide a new and improved commutation scheme which is economical and efficient in operation and which provides reliable commutation that is relatively independent of load from no load to full load operating conditions.

Briefly stated, our invention comprises new and improved power circuits which use controlled turn-on, nongate turn-off solid state semiconductor devices. At least two of these devices are employed as load current carrying turn-on, nongate turn-off controlled conducting devices and are connected in series circuit relationship across the terminals of a direct current power supply. An inductive load circuit is connected in parallel circuit relationship with one of the load current carrying devices to obtain a time-ratio control power circuit, or, is connected between the juncture of the load current carrying devices and a tap point of the power supply to obtain an inverter power circuit in the preferred embodiments of our invention. The commutation circuit for turning off the load current carrying devices at desired times comprises an inductor, at least one capacitor, and at least one controlled turn-on, nongate turn-off device employed as a commutating controlled conducting device. In the preferred embodiment of our commutation circuit for use with a time-ratio control power circuit providing bidirectional power flow or for an inverter circuit, a pair of the capacitors are connected in series circuit relationship across the power supply terminals, and the inductor and one commutating controlled conducting device of the bidirectional conducting type are connected in series circuit relationship between the juncture of the capacitors and the juncture of the load current carrying devices. In the preferred embodiment of our commutation circuit for use with a time-ratio control power circuit providing unidirectional power flow, a pair of turn-on, nongate turn-off unidirectional controlled conducting devices are connected in series circuit relationship across the power supply terminals, and in parallel with the load current carrying devices, and a capacitor and inductor are connected in series circuit relationship between the juncture of the two load current carrying devices and the juncture of the latter pair of unidirectional controlled conducting devices. The operation of many of the circuit embodiments disclosed can be either that of a time-ratio or inverter power circuit, depending upon the sequence of initiating conduction of the load current carrying and commutating devices.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawings where like parts in each of the drawings are identified by the same character reference and wherein:

FIGURE 2 is an equivalent circuit representation illustrating the time-ratio control principle together with a series of curves depicting the form of variable voltage direct current electric energy derived from time-ratio control power circuits;

FIGURE 7 is a detailed circuit diagram of a second embodiment of a power circuit operable as a time-ratio control or single-phase bridge inverter circuit and commutation circuit therefor;

FIGURE 8 is a detailed circuit diagram of a third embodiment of a power circuit operable as an inverter circuit and commutation circuit therefor;

FIGURE 9 is a detailed circuit diagram of a fourth embodiment of a power circuit operable as a time-ratio control or single-phase bridge inverter circuit and commutation circuit therefor;

Figure 1A:
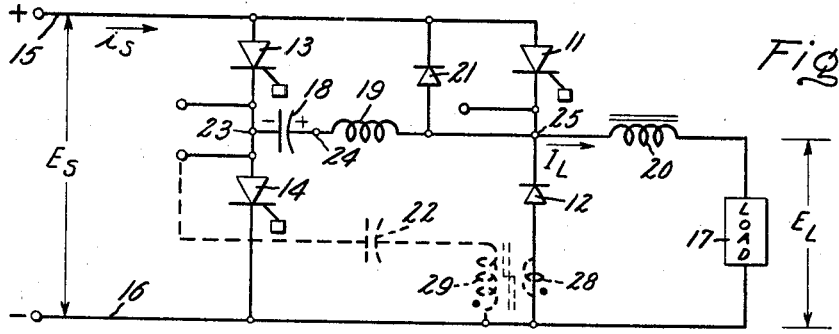
FIGURES 1A and 1B are detailed circuit diagrams of a new and improved time-ratio control power circuit operable in a unidirectional power flow mode and employing a new and improved commutation means in accordance with our invention.
Figure 1B:
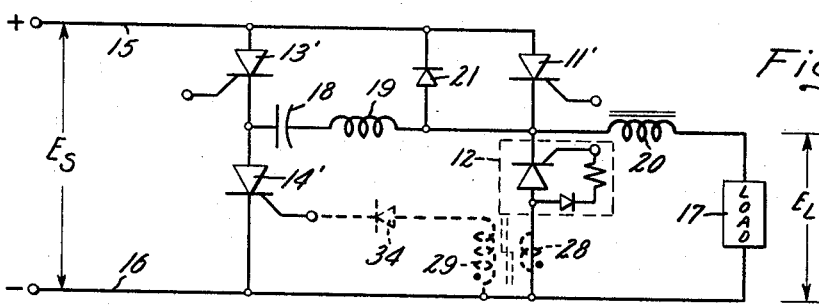

A new and improved time-ratio control power circuit illustrated in FIGURES 1A and 1B of the drawings is constructed in accordance with our invention. The circuit of FIGURE 1A is comprised by two sets of two series connected unidirectional turn-on, nongate turn-off controlled conducting devices 11, 12 and 13, 14 connected across a pair of power supply terminals 15 and 16 which, in turn, are adapted to be connected across a source of electric potential. In the particular embodiment of the invention shown herein, the source of electric potential $E_s$ is a direct current power supply having its positive potential applied to terminal 15 and its negative potential applied to terminal 16. It should be noted that while the time-ratio control circuits herein disclosed are drawn in connection with a direct current power supply, with very little modification these circuits could be used to remove or chop out any desired portions of a half-cycle of applied alternating curent potential. The unidirectional conducting devices 11, 13 and 14 are nongate turn-on $dv/dt$ fired silicon controlled rectifier devices. Silicon controlled rectifiers (SCR's) 11, 13 and 14 may be conventional gate turn-on SCR's wherein the gate is open-circuited. The $dv/dt$ fired SCR is triggered from its blocking or low conductance condition to its high conducting condition by the application of a high $dv/dt$ firing pulse across its terminals. The unidirectional turn-on nongate turn-off controlled conducting device 12, although shown in FIGURE 1A as a diode, may also be an SCR, such as a gate turn-on SCR having a diode and resistor in series circuit relationship between the gate thereof and its anode connected to terminal as shown in FIGURE 1B, such latter circuit enclosed by dotted lines and also identified by numeral 12.

A load device 17 is effectively connected in series circuit relationship with $dv/dt$ fired SCR 11, henceforth described as load current carrying SCR 11. A filter inductance 20 is connected in series circuit relationship intermediate load current carrying SCR 11 and load 17 for a purpose to be described more fully hereinafter. It should be apparent, in the event load device 17 is of an inductive nature, such as the field or armature of an electric motor, that filter inductance 20 may be omitted. Further, there are some applications such as loads comprising electric heaters where the load circuit is substantially noninductive in nature. A commutating circuit comprised by a capacitor 18 and an inductor 19 connected in series circuit relationship, is connected between the juncture of the two $dv/dt$ fired SCR's 13, 14 herein described as commutating SCR 13, and capacitor reset SCR 14, respectively, and the juncture of load current carrying SCR 11 and diode 12, also a load current carrying device, hereinafter referred to as coasting diode 12. A diode 21, hereinafter described as commutating diode 21, is connected across load current carrying SCR 11 for a purpose to be described in detail hereinafter.

Properly phased turn-on signals comprising high $dv/dt$ firing pulses are applied across SCR's 11, 13 and 14 from a suitable $dv/dt$ turn-on signal source such as that shown in FIGURE 22 of the drawings for turning on the SCR's, and in particular, SCR's 11 and 13, in properly timed sequence as explained hereinafter. Due to the unidirectional conducting characteristics of the SCR, the circuit illustrated in FIGURE 1A (and 1B) can only be employed to supply current from a power supply source to load 17 and to circulate load current within the coasting diode-load loop, but cannot operate in a pump back mode wherein current is fed back from the load to the power source. Thus, the time-ratio control power circuit illustrated in FIGURE 1A (and 1B) provides only a unidirectional power flow.

In operation the pulse turn-on signal source mentioned above first initiates conduction or turns on load current carrying SCR 11. The initial pulse also passes through diode 12 and primary winding 28, thereby turning on SCR 14. Upon capacitor 18 being initially charged, SCR 14 becomes nonconductive and the circuit is in readiness for operation. For the interval of time that SCR 11 is conducting, the potential at the point 25 (juncture of load current carrying SCR 11 and coasting diode 12) is essentially the potential of the positive terminal 15 of the direct current supply source. During the interval of time while SCR 11 is conducting, the point 24 (juncture of commutating capacitor 18 and inductor 19) is essentially at the same potential as the point 25, and, hence, the positive terminal of the power supply, while the point 23 (juncture of SCR's 13 and 14) is maintained at some negative potential value lower than the negative potential of the power supply. Hence, the capacitor 18 will be charged with the polarities indicated in FIGURE 1A to a potential somewhat greater than the value of the direct current supply source. During the conducting interval of load current carrying SCR 11, a load current $I_L$ is built up and supplied to the load device 17. Load current carrying SCR 11 remains conducting for a time period dependent upon the amount of current to be supplied to load 17 and then is rendered nonconducting or commutated off in the manner of a time-ratio control power circuit.

Figure 3:
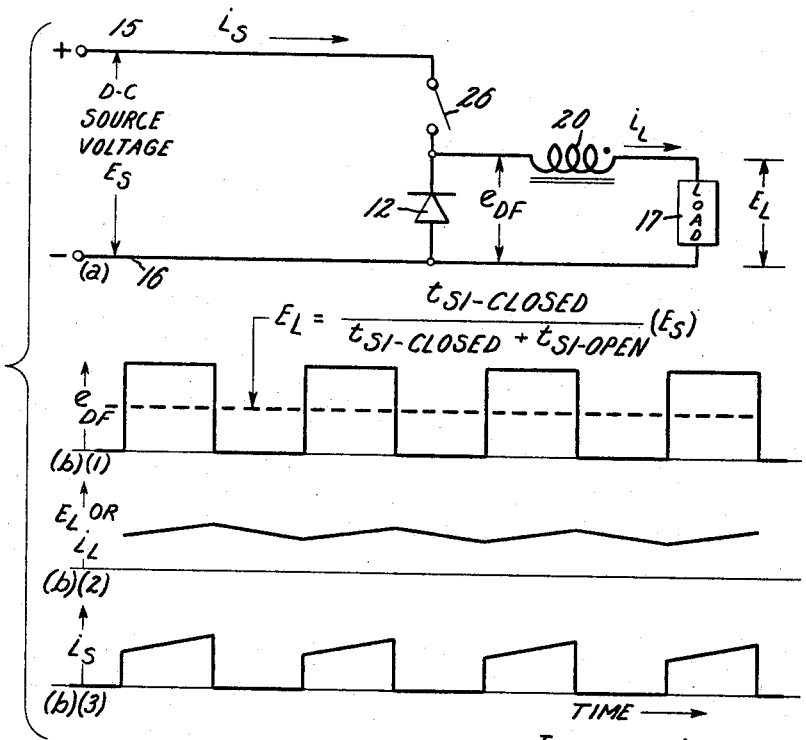
FIGURE 3 is an equivalent circuit diagram of a time-ratio control circuit and associated characteristic curves illustrating the effect of a coasting rectifier and filter inductance added to the equivalent circuit of FIGURE 2.

The theory of operation of time-ratio power control is best illustrated in FIGURE 2 of the drawings wherein FIGURE 2a shows an on-off switch 26 connected in series circuit relationship with a load resistor 27 across a direct current power supply $E_s$. With the arrangement of FIGURE 2a, there are two possible types of operation in order to supply variable amounts of power to the load resistor 27. In the first type of operation, switch 26 is left closed for fixed periods of time and the time that switch 26 is left open can be varied. This type of operation is illustrated in curves 2b wherein curve 2b1 illustrates a condition where switch 26 is left open for only a short period of time compared to the time it is closed to provide an average voltage $E_L$ across the load resistor 27 equal to approximately three-fourths of the supply voltage $E_s$ of the direct current power supply. In FIGURE 2b2 the condition is shown where the switch 26 is left open for a period of time equal to that during which it is closed. Under this condition of operation, the voltage across the load will equal approximately 50 percent of the supply voltage $E_s$. FIGURE 2b3 illustrates the condition where switch 26 is left open for a period of time equal to three times that for which the switch is closed so that the load voltage appearing across the load resistor 27 will be equal to approximately 25 percent of the supply voltage $E_s$. It can be appreciated that by varying the period of time during which switch 26 is left open, the amount of direct current potential applied across load 27 is varied proportionally.

In the second type of operation possible with time-ratio control circuits, switch 26 is closed at fixed times, and the time that the switch is left closed can be varied. product a load voltage that is equal to 0.5 $E_s$. In FIGURE 2a is illustrated in FIGURE 2c of the drawings wherein the amount of time that switch 26 is left closed is varied. In FIGURE 2c1, the condition where switch 26 is left closed for a much greater period of time than it is open, is illustrated to provide a load voltage $E_L$ of approximately 0.75 $E_s$. In FIGURE 2c2, the time that switch 26 is left closed equals the time that it is open to product a load voltage that is equal to 0.5 g. In FIGURE 2c3, the condition is illustrated where switch 26 is left closed for a period of time equal to one-third of the time that switch 26 is left open to provide a load voltage equal to 0.25 $E_s$. It can be appreciated, therefore, that by varying the period of time that switch 26 is left closed, the amount of voltage supplied across load resistor 27 can be varied proportionally. In a similar fashion to that described with respect to switch 26, by varying the period of time that load current carrying SCR 11 of the circuit shown in FIGURE 1 is either in a conducting or nonconducting condition, the power supplied to load 17 can be varied proportionally. It is a matter of adjustment of the phasing of the turn-on control signals supplied across the terminals of SCR's 11 and 13 which determines the amount of time that SCR 11 is either conducting or non-conducting. This, of course, in turn, determines the power supplied to load 17 in the manner described with relation to FIGURE 2. Whether the amount of time that SCR 11 is in its blocking condition is varied, or whether the amount of time that SCR 11 is conducting is varied, to provide such proportionally controlled power to load 17 usually depends upon the load in question. Insofar as the principles of commutation to be described hereinafter are concerned, it does not matter which type of operation is employed.

FIGURE 3 of the drawings better depicts the nature of the output signal or voltage $E_L$ developed across a load resistor 17 by the circuit shown in FIGURE 1. In FIGURE 3a, SCR 11 is again depicted by the on-off switch 26 and the voltage or current versus time curves for the various elements of this circuit are illustrated in FIGURE 3b. FIGURE 3b1 illustrates the voltage versus time characteristics of the potential $e_{DF}$ appearing across coasting diode 12. It is to be noted that the potential $e_{DF}$ is essentially a square wave potential whose period is determined by the timing of switch 26. For the period of time that switch 26 is left closed, a load current $i_L$ flows through filter inductance 20, load 17, and back into the power supply. Upon switch 26 being opened (which corresponds to SCR 11 being commutated off to its blocking or nonconducting condition) the energy trapped in the filter inductance 20 will try to produce a coasting current flow in a direction such that it will be positive at the dot end of the filter inductance. This energy, which is directly coupled across coasting diode 12, causes diode 12 to be rendered conductive and to circulate a coasting current substantially equal to load current $i_L$ through load 17 and coasting diode 12, thereby discharging filter inductance 20. Consequently, the load voltage $E_L$, and for that matter load current $i_L$, will appear substantially as shown in FIGURE 3b2 of the drawings, as an essentially steady state value lower than the source voltage $E_s$ by a factor determined by the timing of on-off switch 26. This load voltage can be calculated from the expression shown in FIGURE 3. This expression states that the load voltage $E_L$ is equal to the time that switch 26 is left closed divided by the time that switch 26 is left closed plus the time switch 26 is left open, all multiplied by the power supply voltage $E_s$. The current $i_s$ supplied from the power supply to switch 26 is illustrated in FIGURE 3b3 and is essentially of square wave form having the same period as the voltage $e_{DF}$. It should be noted that upon the next succeeding cycle of operation when switch 26 is closed, the filter inductance 20 will again be charged in a manner such that when it discharges upon switch 26 being opened, its potential is positive at the dot end so that coasting diode 12 is again rendered conductive and discharges the filter inductance through load 17 to provide the essentially continuous steady state load voltage $E_L$ shown in FIGURE 3b2. It must be reemphasized that the time-ratio control principle need not employ a filter inductance 20 and can be used with a noninductive load circuit whereby load current $i_L$, and for that matter, load voltage $E_L$ and supply current $i_s$ will then all be of square wave shape as $e_{DF}$.

Returning to FIGURE 1A of the drawings, it can be appreciated that the timing of SCR 11 being switched on and commutated off determines the load voltage $E_L$ supplied across load 17 in the manner discussed in connection with FIGURE 3 of the drawings. In order to commutate off the SCR 11, a new and improved commutation circuit means comprised by elements 13, 18, 19 and 21 has been provided. The new and improved commutation circuit operates in the following manner: Assume that SCR 11 is initially in its steady state "on" or conducting condition. The circuit remains in the condition wherein capacitor 18 is charged with the polarities indicated in FIGURE 1A to a potential somewhat greater than the value of the direct current supply source $E_s$ for the period of time that load current carrying SCR 11 is allowed to conduct as determined by the time-ratio control principals described in connection with FIGURES 2 and 3.

Figure 11:
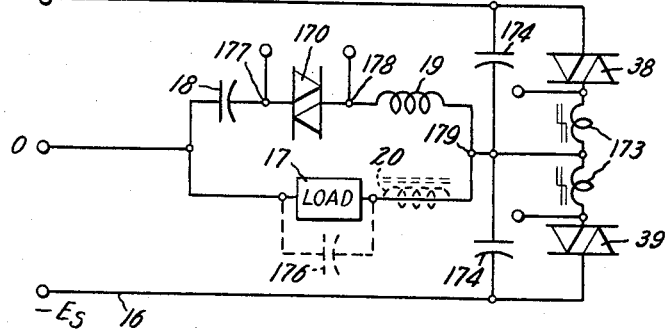
FIGURE 11 is a detailed circuit diagram of a fifth embodiment of a power circuit operable as a time-ratio control or single-phase inverter circuit and commutation circuit therefor; and illustrates a first form of power circuit employing a center-tap power supply.

Thereafter, some predetermined number of microseconds prior to the time that is desired to commutate off the load current carrying SCR 11, commutating SCR 13 is turned on by the application of a suitable $dv/dt$ signal across the terminals thereof. A means for preventing simultaneous firing or turning-on of both $dv/dt$ SCR's 13 and 14 when applying a $dv/dt$ pulse across SCR 13 (or SCR 14) must be provided. This means may comprise the inherent inductance of the leads interconnecting SCR's 13 and 14 if sufficiently long, or may comprise small saturable reactors as shown in FIGURE 11. Due to the relative magnitudes of the turn-on time and fall time for present-day $dv/dt$ fired SCR's, firing circuits employing isolating capacitors as shown in FIGURE 11 should also be used. In the event that $dv/dt$ fired SCR's are obtained having turn-on times considerably smaller than the fall times, then the isolating capacitors may be omitted. For purposes of simplicity the saturable reactors and isolating capacitors have been omitted in FIGURE 1A although it is to be understood that in the most general case employing present-day $dv/dt$ fired SCR's, such components are used. Upon commutating SCR 13 being rendered conductive, the potential of point 23 will rise abruptly to the positive terminal of the direct current power supply, and the potential of point 24 will rise abruptly above the positive terminal of such supply by the amount of the potential cross capacitor 18. Upon this occurrence, capacitor 18 will be discharged by a current flowing through inductor 19, commutating diode 21 and commutating SCR 13, and will maintain a reverse polarity potential across the load current carrying SCR 11 for a sufficient time to cause this rectifier to be turned off. In discharging through inductor 19, a magnetic field will be built up around inductor 19 which upon collapsing will cause a reverse polarity charge to be built up across capacitor 18 such that point 24 becomes negative with respect to point 23, the potential of point 24 dropping to some negative value below zero. As explained with relation to FIGURE 3, upon load current carrying SCR 11 being commutated off to its blocking condition, the energy trapped in the filter inductance 20 is directly coupled across coasting diode 12 and causes diode 12 to be rendered conductive and to circulate a coasting current substantially equal to load current $I_L$ through load 17 and coasting diode 12. The initial conduction or turn-on of coasting diode 12 results in connecting point 25 to the negative terminal of the direct current power supply thereby immediately driving the potential of point 25 from the full positive potential of the power supply down to its full negative potential. At this time, the value of the charge on capacitor 18 will be such that capacitor 18 will be charged further towards the full negative value of the direct current power supply.

Due to the oscillatory effect of the circuit formed by capacitor 18 and inductor 19, capacitor 18 will be charged to a potential somewhat beyond the full negative value of the direct current power supply at the end of the time interval when the flow of charging current through commutating SCR 13 ceases, that is, goes through a current zero. At this time, the potential of point 24 becomes equal to the negative terminal of the power supply and the potential of point 23 rises above the positive terminal, impressing a reverse voltage across commutating SCR 13 and thereby turning it off.

At the termination of conduction of commutating SCR 13, capacitor reset SCR 14 is rendered conductive by the application of a suitable $dv/dt$ control signal impressed across the terminals thereof. A suitable source of such $dv/dt$ signal may comprise a saturable core transformer (shown in dotted line form in FIGURE 1) having a primary winding 28 thereof connected intermediate coasting diode 12 and the negative terminal 16 of the power supply and a secondary winding connected across the terminals of SCR 14. Capacitor 22 is connected between the anode of SCR 14 and the secondary winding 29. With this arrangement, the distributed inductance and capacitance of the saturable transformer in conjunction with capacitor 22 provides a time delay sufficient for SCR 13 to be completely turned off before SCR 14 begins to conduct. Thus, while commutating SCR 13 is being turned off, coasting diode 12 is rendered conductive by the discharge of the energy stored in inductance 20, and the initial circulating current flowing through the saturable transformer generates a voltage pulse having a high $dv/dt$ wavefront. Thus, reset SCR 14 is rendered conductive whereby the potential of point 23 becomes equal to the negative potential of the power supply so that point 24 will be driven to a potential below the negative terminal of the supply by the amount of the charge on the capacitor 18. As a consequence, a current will flow through inductor 19 in the reverse direction, and through reset SCR 14 and coasting diode 12 to discharge capacitor 18. During this period, due to the oscillatory effect of capacitor 18—inductor 19, capacitor 18 will be reversely charged so that point 24 will be driven to a potential positive with respect to the positive terminal of the power supply. As current in inductor 19 ceases to flow, that is, drops to zero, point 24 drops to the terminal 16 voltage and point 23 drops below terminal 16 thereby turning off SCR 14. Thereafter, upon load current carrying SCR 11 being turned on again by the turn-on signal source, the potential of point 25 will immediately rise to the full positive value of the power supply resulting in the production of a square wave output at the point 25 which is supplied to load 17. Concurrently, point 24 will be further charged up to and beyond the potential of the positive terminal of the power supply thereby completely recharging or resetting capacitor 18 with the original polarity indicated in FIGURE 1A. During the commutation period of load current carrying SCR 11 while capacitor 18 is being charged, commutating diode 21 serves to clamp the potential point 25 to the positive terminal of the power supply so that it does not exceed these limits. The point 24 and capacitor 18, however, will be charged to some potential value greater than the power supply potential by an amount determined primarily by the power losses during the commutation period. The square wave potential appearing across the load results from the fact that load current carrying SCR 11 is quickly commutated off without requiring any load current to accomplish the commutation, and any circulating reactive load current is returned to the direct current power supply by commutating diode 21 so that it will not interfere with the operation of the time-ratio control power circuit. This results in greatly improving the efficiency of the circuit since the load current does not have to flow through any commutating inductance, and results in much better regulation as well as allowing the circuit to be operated to much higher frequencies. This improved efficiency and high operating frequencies are further made possible by the fact that no large circulating currents are built up during the commutating intervals due to excess energy being drawn from the power supply to accomplish commutation. As a consequence, the circuit can be used up to much higher frequencies than circuits heretofore available thereby allowing the circuit to be used over a wider range of frequencies. The commutating interval is approximately one cycle of the frequency to which capacitor 18 and inductor 19 are series tuned. From a consideration of the above description of operation, it can be appreciated that inductor 19 operates as a flywheel utilizing the energy required to achieve commutation at the end of one interval of conduction to partially recharge the capacitor 18 thereby conserving this energy for use in achieving commutation during a succeeding commutation interval. As a consequence of this mode of operation, there is little or no energy wasted to accomplish commutation and results in a circuit which is in the order 98% efficient with respect to the useful utilization of the electrical energy drawn from the direct current power supply. Further, the efficient and reliable commutation obtained with our commutation circuit is relatively independent of load from no load to full load operating conditions. Thus, the effect of an inductive load is to merely further increase the reverse charge built up on capacitor 18 during the commutation interval by the combined flywheel effect in inductor 19 and the inductive load. As a result, the magnitude of the discharge current of capacitor 18, which must exceed the load current in order to successfully commutate load current carrying SCR 11, increases as load current increases, thereby enabling a still greater load current to be supplied by the time-ratio control system. A similar effect occurs when the load circuit is purely resistive, but when the load has a leading power factor the effect is similar to that of a no load condition, inasmuch as the current in SCR 11 may drop to zero before the commutation time. In this case, SCR 11 needs no commutation, but the commutation circuit operates as above described to maintain the commutating circuit operative.

FIGURE 1B illustrates a time-ratio control power circuit which also provides only a unidirectional power flow in the load circuit, as in FIGURE 1A, but which employs conventional gate turn-on, nongate turn-off silicon controlled rectifiers 11', 13' and 14', and a blocking diode 34 in place of capacitor 22. The blocking diode replaces capacitor 22 since the transient characteristics of a gate fired SCR does not require the time delay circuit necessary for present day $dv/dt$ fired SCR's. The circuit of FIGURE 1B operates in the same manner as the circuit of FIGURE 1A, and since it employs the more conventional gate fired SCR's, it is our preferred embodiment for a time-ratio control power circuit providing unidirectional power flow. It should be noted that the coasting diode 12 of FIGURE 1A is replaced by a circuit in FIGURE 1B, which obtains the function of a coasting diode and is comprised by a gate fired SCR resistor and diode as heretofore described, such circuit also being designated by numeral 12.

Figure 4:
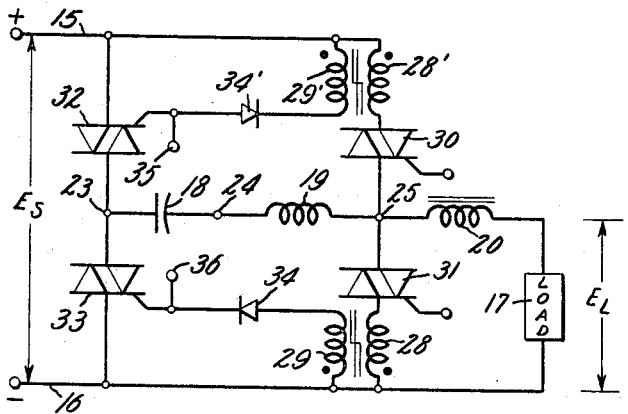
FIGURE 4 is a detailed circuit diagram of the time-ratio control power circuit and commutation circuit as shown in FIGURE 1 but operable in a bidirectional power flow mode.
Figure 10:
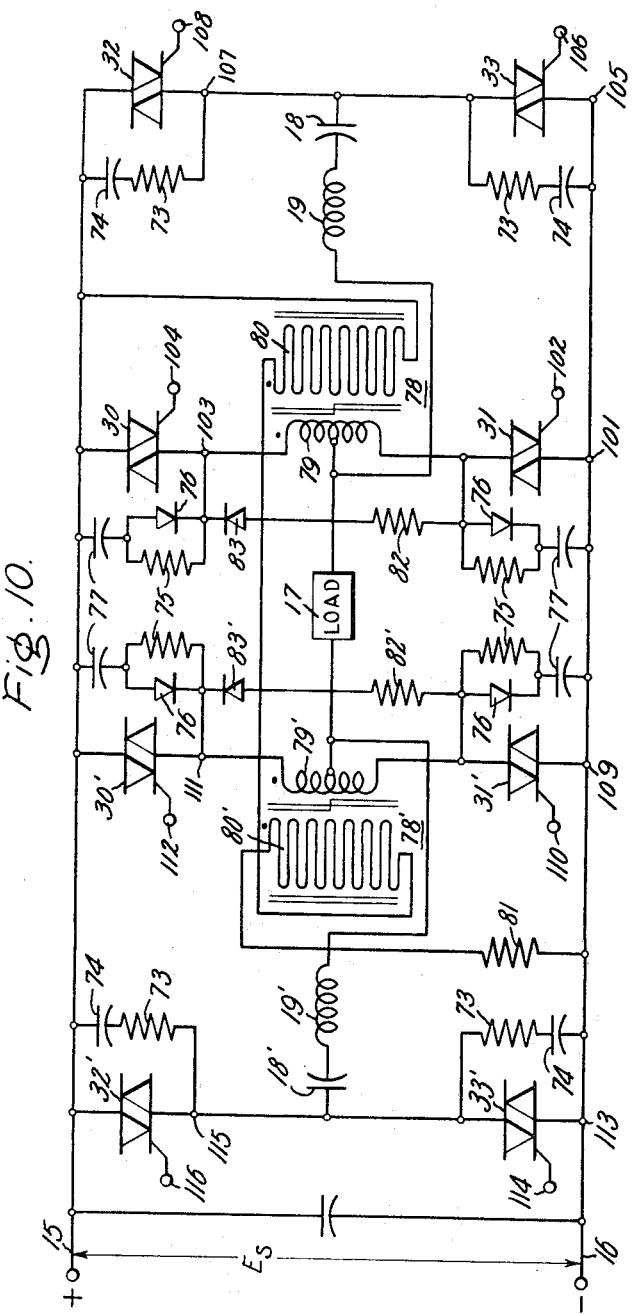
FIGURE 10 is a detailed diagram of the circuit shown in FIGURE 7 and further including transient suppressing reactors, and resistor-capacitor networks.

FIGURE 4 of the drawings illustrates a modification of the time-ratio control power circuit shown in FIGURE 1 wherein the load current carrying $dv/dt$ fired SCR 11 and commutating diode 21 are replaced by a first gate turn-on, nongate turn-off solid state bidirectional conducting triac device 30, coasting diode 12 is replaced by a second triac device 31, commutating SCR 13 is replaced by a third triac device 32 and capacitor resetting SCR 14 is replaced by a fourth triac device 33 to form an all triac version of the circuit of FIGURE 1. It must be understood that devices 32, 33 can be unidirectional conducting devices such as gate turn-on or $dv/dt$ fired SCR's, since devices 32, 33 are not called upon to conduct in both directions. However, an all triac version is illustrated in FIGURE 4 for purposes of utilizing identical components in the circuit. A series connected resistor-capacitor network may also be connected across each of the triacs hereinafter disclosed, if they are particularly susceptible to $dv/dt$ firing, to limit the rate of rise of voltage across such triacs, if desired, as shown in FIGURE 10. The triac is a gate turn-on, nongate turn-off bidirectional conducting device which has been newly introduced to the electrical industry by the Rectifier Components Department of the General Electric Company, Auburn, N.Y. Similar to the gate turn-on, nongate turn-off silicon controlled rectifier, the triac may be switched from a high impedance blocking state to a low impedance conducting state when a low voltage gate signal is applied between the gate terminal and one of the load terminals. Also, like the silicon controlled rectifier, once the triac is switched to the low impedance conducting state, the gate electrode loses control and current flow through the device must be interrupted by some external means while the gate signal is removed in order to return the triac to its high impedance blocking state. A further characteristic of the triac is that once it is gated on, it will conduct current through the device in either direction, depending upon the polarity of the potential across the device. For a more detailed description of the triac gate turn-on, nongate turn-off solid state semiconductor device, reference is made to an article entitled, "Bilateral SCR Lets Designers Economize on Circuitry," by E. K.

Howell appearing in the Jan. 20, 1964, issue of Electronic Design magazine.

In the particular embodiment illustrated in FIGURE 4, triacs 30 and 31 may be designated as first and second load current carrying triacs, respectively, while triacs 32 and 33 may be designated as first and second commutating triacs, respectively. A suitable gating signal for rendering conductive commutating triacs 33 and 32 is provided from the secondary windings 29 and 29', respectively, of two saturable core transformers. Blocking diodes 34 and 34' are connected between secondary winding 29 and the gate of triac 33, and between secondary winding 29' and the gate of triac 32, respectively, in order to provide a desired polarity signal to the commutating triacs and thereby effect their conduction in a desired direction. The primary windings 28 and 28' of the saturable core transformers are connected in series circuit relationship with a load terminal of load current carrying triacs 31 and 30, respectively.

For purposes of explaining the operation of the circuit, triac 31 may be further described as a coasting and pump back triac device. In operation, the circuit of FIGURE 4 operates similar to the circuit of FIGURE 1 in many respects, but, in addition, is capable of performing one additional function. That is, the circuit of FIGURE 4 is capable of operating in a first mode where current is supplied to load device 17 from the power supply, and also is capable of operating in a second mode where load 17, which for example, might constitute the motor of an electric trolley coasting downhill, is employed as a generator to pump electric power back into the power supply connected across terminal 15 and 16. Again, it should be evident that filter inductance 20 need not be a separate element but may comprise a part of load device 17, or the load circuit may even be noninductive. The first mode of operation where the load 17 is being supplied power from the direct current power supply will first be described.

Assuming that triacs 30 and 31 are each initially in their nonconductive or blocking states, the application of a gating signal from a suitable gating signal source to the gating electrode of triac 30 initiates conduction therethrough. During the interval of time while triac 30 is conducting, and as described in relation to the operation of the circuit of FIGURE 1, the potential at points 24 and 25 will be essentially the potentials of the positive terminal 15 of the direct current power supply while point 23 will be maintained at some negative potential value lower than the negative potential of the power supply, capacitor 18 being charged with the polarities indicated in FIGURE 1A. The circuit remains in this load current conducting condition for the period of time that load current carrying triac 30 is allowed to conduct as determined by the time-ratio control principles described in connection with FIGURES 2 and 3. Thereafter, just prior to the time that it is desired to commutate off triac 30, triac 32 will be gated on by the application of an external gating signal (of the same polarity as that obtained from the secondary winding 29'—diode 34' circuit) applied to terminal 35 which is connected to the gating electrode of triac 32. Upon commutating triac 32 being rendered conductive, (in a direction from terminal 15 to point 23), the potential of the point 23 will rise abruptly to the positive potential of the power supply, the potential of point 24 will rise abruptly above the positive potential of the supply by the amount of potential across capacitor 18, and capacitor 18 then discharges in an oscillatory manner through inductor 19 and load current carrying triac 30 in a direction opposite to that of the load current flowing therethrough. At the same time that triac 32 is gated on, the gating signal is removed from the gate electrode of triac 30, if it has not already been done so, but because triac 30 has been conducting load current, it does not turn off completely instantaneously. Thus, immediately after commutating triac 32 is turned on, both triac 32 and triac 30 are conducting. Commutating capacitor 18 is sufficiently large so that a half cycle of the oscillatory discharge produces a reverse current through triac 30 of sufficient magnitude and for a sufficient interval to commutate it off. Triac 32 is thence commutated off in the same manner as described for commutating SCR 13 in FIGURE 1, that is, by virtue of the oscillatory current passing through a current zero.

After load current carrying triac 30 and commutating triac 32 have both been fully commutated off, triac 31 may be turned on by the application of a suitable gating signal to its gate electrode such that triac 31 conducts in a direction from the power supply terminal 16 to point 25, thereby turning on triac 33 after a time delay by means of saturable core transformer 28, 29. This conduction of triac 31 may be described as a coasting mode of operation whereby the load current is circulated within the triac 31—load circuit loop as described with relation to the coasting mode of operation of coasting diode 12 in FIGURE 1. It can be seen that by employing only one filter inductance 20 that the load current will be reduced to zero upon triac 31 ceasing conduction. It may thus be desirable in particular applications to employ a T filter network comprising two series connected inductances and a capacitor connected from their juncture to the negative terminal 16 whereby current continues to flow through load 17 even after current ceases to flow through triac 31. After triac 31 has been commutated off due to commutating triac 33 being rendered conductive by a signal generated across the saturable core transformer secondary winding 29, commutating triac 33 is thence commutated off in the same manner as previously described for the commutation of triac 32, that is, by the capacitor discharge oscillatory current passing through a current zero. After triacs 31 and 33 have been commutated off, triac 30 may be rendered conducting again by the application of a gating-on signal to the gating electrode thereof and load current may thus be maintained through load 17 without substantial change in magnitude by sequential turning on and commutation of triacs 30 and 31 in the manner of the time-ratio control power operation described with reference to FIGURES 2 and 3.

The circuit of FIGURE 4 will now be considered in its second mode of operation, that is, when load 17 might be, for example, an electric trolley car that is coasting down hill and, hence, generating current. Under these conditions, it is desirable to supply the current generated by load 17 back into the direct current power supply. When operating under these conditions, triac 30, which for this purpose, may be designated as a feedback triac, is initially in its blocking condition and triac 31, which for this purpose may be designated as the pumpback triac is periodically turned on and off by the application of a suitable gating-on signal to the gating electrode thereof. In this second mode of operation of the circuit, triac 31 is rendered conducting in a direction from point 25 to the negative power supply terminal 16. When thus turned on, pumpback triac 31 will be commutated off by the application of an external gating signal to terminal 36 connected to the gating electrode of commutating triac 33. This external gating signal is required since blocking diode 34 in the secondary winding 29 circuit of the saturable core transformer prevents passage of a gating-on signal of the correct polarity to cause commutating triac 33 to conduct in a direction from terminal 23 to the negative power supply terminal 16. Each time that triac 31 is gated on, filter inductance 20, or an inductive load 17, will be charged with the current from load 17 which in this mode of operation of the circuit is acting as a generator and, hence, will be referred to as load generator 17. Upon pump back triac 31 being commutated off, the potential across filter inductance 20 adds to the potential of load generator 17 to drive the potential of point 25 positive with respect to power supply terminal 15. Feedback triac 30 is rendered conductive in the feedback direction, that is from point 25 to power supply terminal 15 by reason of the application of a suitable gating signal to the gate electrode thereof, thereby turning on triac 32 after a time delay by means of saturable core transformer 28', 29'. Power will then be pumped back from the load generator 17 through filter inductance 20 and triac 30 until such time that triac 31 is again turned on and point 25 drops to a value equal to terminal 16, or, alternatively, such time that filter inductance 20 is discharged sufficiently to allow the potential of point 25 to drop to a value equal to or slightly below the value of the potential of terminal 16. This results in reversing the polarity of the potential across triac 30, turning it off, and allowing it to resume its blocking position. Upon this occurrence, the circuit resumes its original condition thereby completing one cycle of the second mode of operation, and pump back triac 31 can then be again gated on in the feedback direction to initiate a new cycle.

From the above description, it can be appreciated that by reason of the bidirectional conducting characteristic of triacs 30 and 31, the circuit of FIGURE 4 can be operated in either one or two modes to supply current to a load 17 or to feed current generated by a load generator back to the power source as determined by the conditions of operation of the load. It, therefore, can be appreciated that the circuit of FIGURE 4 makes a highly efficient single output polarity time-ratio control power circuit for use with traction motors, for example, use in driving electrically operated vehicles wherein a two-way or bidirectional power flow is often encountered. Although not illustrated in FIGURE 4. It is to be understood that present day triac devices are susceptible to $dv/dt$ firing, and for this reason, a cushioning RC network such as shown in FIGURE 10 would in general be employed to prevent inadvertent firing of the triac devices shown in FIGURE 4 and hereinafter.

Figure 5:
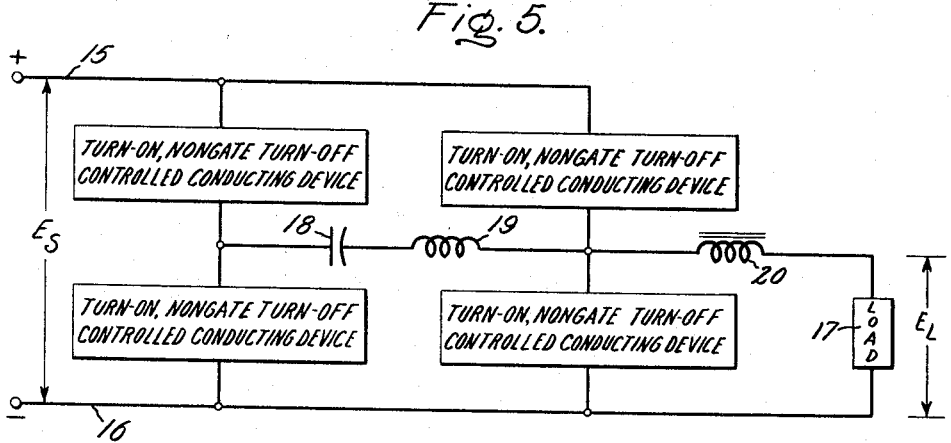
FIGURE 5 is a generalized circuit diagram of the time-ratio control power circuit shown in FIGURES 1 and 4.

FIGURE 5 of the drawings shows a block diagram of a generalized form of single output polarity time-ratio control power circuit constructed in accordance with our invention. The blocks designated turn-on, nongate turn-off controlled conducting device may each comprise a gate fired silicon controlled rectifier, a $dv/dt$ fired silicon controlled rectifier having its gate open circuited or a bidirectional conducting device such as a triac or diac, or any combination thereof. The blocks designated turn-on, nongate turn-off controlled conducting device include suitable firing circuits for causing the associated turn-on, nongate turn-off device to conduct current and thereby supply the load with load current, feedback current to the power supply, or effect commutation. In the case of the gate fired turn-on devices, the firing circuit may be of the type illustrated in FIGURES 20 or 21. In the case of $dv/dt$ fired turn-on devices, the firing circuit may be of the type illustrated in FIGURE 22. FIGURE 5 thus illustrates that the time-ratio control power circuit constructed in accordance with our invention can be comprised of virtually any combination of individual controlled conducting devices including those disclosed in the prior FIGURES herein, and also the diac device to be next described as well as reverse polarity connected silicon controlled rectifiers or silicon controlled rectifiers having reversely poled diodes connected thereacross.

Figure 6:
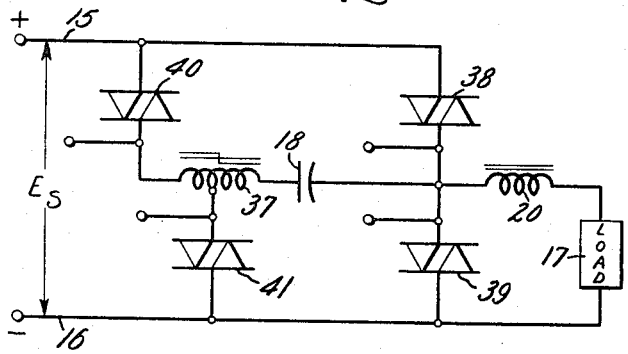
FIGURE 6 is a modification of the circuit shown in FIGURE 5, and illustrates a time-ratio control power circuit operable in a bidirectional power flow mode and commutation circuit therefor.

FIGURE 6 of the drawings shows a different form of a new and improved single output polarity time-ratio control power circuit constructed in accordance with our invention which also is adapted to provide bidirectional power flow as in the case illustrated in FIGURE 4. The embodiment of the invention shown in FIGURE 6 is similar to the circuit of FIGURE 4 insofar as construction and operation of the commutation circuit and load circuit is concerned, and hence these two components will not be again described. It may be noted, however, that inductor 19 shown in FIGURE 4 is replaced by a tapped saturable core reactor 37 in FIGURE 6. Also, in place of the gate turn-on, nongate turn-off bidirectional conducting triacs 30 through 33 in FIGURE 4, diac devices 38 through 41 are employed in the circuit arrangement of FIGURE 6. The diac is a nongate turn-on nongate turn-off solid state bidirectional controlled conducting device, such controlled conducting device being termed a power diac. The power diac is esentially a NPNPN, 5-layer junction device capable of conducting currents as large as 100 amperes in either one of two directions through the device, dependent upon the polarity of the potential applied across the device. The power diac is triggered from its blocking or low conductance condition to its high conducting condition by a technique known as $dv/dt$ firing wherein a high $dv/dt$ firing pulse is applied across its terminals similar to the firing of the $dv/dt$ fired SCR shown in FIGURE 1A. Because of the $dv/dt$ firing, the diacs must also be provided with means to prevent simultaneous firing of both $dv/dt$ SCR's (38 and 39) upon applying such $dv/dt$ pulse across one of the diacs, as was described with relation to FIGURE 1A. For sake of simplicity such means are omitted in FIGURE 6 but are shown in FIGURE 11 and are understood to be employed with all $dv/dt$ fired devices connected in series circuit relationship. Such means may consist of inherent lead inductance and capacitance. It should be noted that the power diac referred to in this application is an entirely different device than its cousin the signal diac which is a low current, three-layer junction device designed to operate in the milliwatt region and used primarily in conjunction with gating circuit applications. For a more detailed description of the power diac device, reference is made to an article entitled, "Two Terminal Asymmetrical and Symmetrical Silicon Negative Resistance Switches," by R. W. Aldrich and N. Holonyak, Jr., appearing in the Journal of Applied Physics, vol. 30, No. 11, November 1959, pp. 1819–1824.

The advantage of employing a tapped saturable core reactor 37 in the circuit of FIGURE 6 is the fact that saturable reactor 37 provides the relative conducting periods of diacs 38 and 39, respectively, relieving the need of external timing circuits, that is, diacs 38 and 40 may be turned on simultaneously, and after a predetermined time, diacs 39 and 41 are turned on simultaneously. Further, the timing is varied by varying the tap point on reactor 37.

The time-ratio control power circuit of FIGURE 6 may obviously also be operated in a unidirectional power flow mode. However, an economically more practical circuit for obtaining unidirectional power flow than is the circuit of FIGURE 6 employs gate turn-on SCR's (or $dv/dt$ fired SCR's) for diacs 38, 40, 41, a coasting diode for diac 39, and a commutating diode in reverse polarity relationship across the load current carrying SCR, in the same relative circuit relationship as shown in FIGURES 1A and 1B.

A bridge version of the time-ratio control power circuit shown in FIGURE 4 is illustrated in FIGURE 7 wherein the circuit is operable as a reverse polarity time-ratio control circuit in a first mode of operation or as a full-wave bridge inverter circuit in a second mode of operation as determined by the sequence of firing of the triac devices. Thus, in the first mode of operation as a reverse polarity time-ratio control power circuit the circuit comprising elements 17 through 20, 30 through 33, 20', 31', 42 and 42' comprise a time-ratio control power circuit having a polarity of the electric power being supplied to load 17 or fed back therefrom into the power supply always of a positive sign at point 43, the juncture of filter inductance 20 and load 17. A time-ratio control power circuit comprised of the elements just above recited operates in the identical manner of the circuit illustrated in FIGURE 4 with triac 31' completing the load circuit connection to the negative power supply terminal 16. The saturable core transformers shown in FIGURE 4 are not indicated in FIGURE 7 in order to show a more general circuit wherein the gating signals may be obtained entirely from an external source. The circuit comprised by elements 17, 18' through 20', 30' through 33', 20, 31, 42 and 42' form a time-ratio control power circuit having a power developed across load 17 of polarity opposite to that produced by the circuit comprised essentially by the unprimed numbered elements, that is, the power supplied to load 17 or fed back therefrom is always positive at point 44, the juncture of load 17 and filter inductance 20'. Thus, as determined by which one of the two independent time-ratio control power circuits is operated at any one particular time, a power of either polarity may be obtained across load 17. Since the operation of the circuit shown in FIGURE 7 in the time-ratio control power circuit mode is identical to that described in relation to FIGURE 4, it is believed that further description thereof is unnecessary. It is sufficient to summarize the operation of the circuit shown in FIGURE 7 as a time-ratio control power circuit as follows: Either of the triacs 30 or 30' is turned on to supply load current to load 17. Then, after a predetermined time interval, the conducting triac is commutated off by the associated commutating triac 32 or 32', respectively, and coasting triacs 31 and 31' are rendered conductive. This sequence is continued in the manner described in relation to FIGURES 1, 2 and 3 to supply a desired level of direct current power to the load. Each circuit may also be operated in the feedback power flow mode of operation as described with relation to FIGURE 4, and the feedback power flow may be in either direction.

The inverter circuit mode of operation of FIGURE 7 employs two pairs of load current carrying triac devices wherein each pair of devices is connected in diametrically opposite relationship and is alternately conducting. Thus, a first pair of load current carrying triacs comprising triacs 30 and 31' is simultaneously rendered conductive whereby point 43 is effectively connected to the positive power supply terminal 15 and point 44 is effectively connected to the negative power supply terminal 16 for a first interval of time. Subsequently, triacs 30 and 31' are commutated off by means of commutating triacs 32 and 33', respectively, and load current carrying triacs 30' and 31 are simultaneously rendered conductive whereby point 44 is effectively connected to the positive power supply terminals 15 and point 43 is effectively connected to the negative power supply terminal 16. From this description, it can be appreciated that the timing or sequence of firing of each pair of diametrically opposite load current carrying triacs serves to connect the load circuit across power supply terminals 15 and 16 in an alternate manner so as to develop an alternating current flow through the load circuit during successive periods of operation. The full-wave bridge inverter operation obtained results in an alternating voltage developed across load 17 having a peak-to-peak amplitude equal to twice the power supply voltage E$_S$. Since the elements in the inverter mode of operation function in the same manner as in the time-ratio control power circuit mode of operation which has been described previously in connection with FIGURE 4, further description of this feature of the circuit is not believed necessary. Needless to say, the value of load current developed through load device 17 can be readily adjusted by adjusting the intervals of time during which the diametrically opposite load current carrying triacs are allowed to conduct. Thus, the bridge inverter mode of operation of FIGURE 7 makes available a variable pulse width inverter circuit that can be easily adjusted to provide any desired amount of power to load 17.

A center-tap transformer inverter circuit constructed in accordance with our invention is shown in FIGURE 8. The single phase inverter of FIGURE 8 is comprised by a first set of two interconnected turn-on, nongate turn-off solid state conducting devices wherein a first of such devices is a load current carrying bidirectional triac 50 and the second is a commutating unidirectional $dv/dt$ fired SCR 51 interconnected in circuit relationship through a first holding off $dv/dt$ red SCR 52, and a second set of two interconnected conducting devices, load current carrying triac 53, and commutating $dv/dt$ fired SCR 54, likewise interconnected in circuit relationship through a second holding off $dv/dt$ fired SCR 55. The two sets of controlled conducting devices 50, 51 and 53, 54 are connected in parallel circuit relationship through series connected commutating capacitor 18 and inductor 19. Each of the holding off $dv/dt$ fired SCR's has their anode connected to respective ends of the center-tapped primary winding 56 of the transformer 57 having its secondary winding 58 connected across a suitable load device 17. The primary winding 56 has its center tap connected to the positive terminal 15 of a direct current power supply source, and the negative terminal 16 of the direct current power supply is connected to the cathodes of commutating $dv/dt$ fired SCR's 51 and 54.

It should be obvious that the unidirectional $dv/dt$ fired SCR's 51, 52, 54, 55 may just as conveniently be gate fired SCR's with an appropriate gate turn-on signal source being provided.

In operation, the center-tap transformer inverter circuit shown in FIGURE 8 will have a source of gating signals (not shown) connected to the gating electrode of triac devices 50, 53 and a source of $dv/dt$ turn-on signals (not shown) connected across the terminals of $dv/dt$ fired SCR's 51, 52, 54, 55 so as to turn on these controlled conducting devices in a predetermined sequence. The turn-on sequence is such that upon load current carrying triac 50 being gated on by the gating signal source, current will be conducted from the positive terminal 15 of the power supply through the left (as viewed by the reader) half of primary winding 56, through triac 50 to the negative terminal 16 of the power supply whereby the polarity of the voltage across the two halves of the primary winding 56 will have the polarities indicated. The current passing through the left winding half of primary winding 56 will, of course, induce a voltage in the other half of the primary winding 56 to about double the supply voltage E$_s$ at the right end of the winding marked ++. Concurrently, the current transformed into the secondary winding 58 will be supplied to load 17 with a given polarity. Thereafter, in order to commutate off triac 50, $dv/dt$ fired SCR's 52 and 54 are turned on simultaneously. This allows the charge which has been built up on capacitor 18 to be discharged in an oscillatory manner through inductor 19, SCR 54 and triac 50 in a direction opposite to that of the load current flowing therethrough and finally through SCR 52. During this commutating action, $dv/dt$ fired SCR 55 holds off the ++ potential of the right primary winding half to prevent it from interfering with the commutating action. During commutation, a charge of the reverse polarity is built up across capacitor 18 by the flywheel action of inductor 19, that is, by the oscillatory discharge therethrough. Upon commutation of triac 50, load current carrying triac 53 is gated on and current will then be conducted from the positive power supply terminal 15 through the right half of primary winding 56, through triac 53 to the negative power supply 16 so as to reverse the polarity of the potentials illustrated in FIGURE 8 and thereby reverse the polarity of the current being supplied to load 17. At a predetermined interval thereafter, $dv/dt$ fired SCR's 51 and 55 are turned on to thereby commutate triac 53. This allows the reverse polarity potential built up across capacitor 18 to be discharged in an oscillatory manner through SCR 51, triac 53 in a direction opposite to that of load current flowing therethrough, SCR 55 and inductor 19 to commutate off triac 53. During this action, SCR 52 holds off the double value positive potential built up at the left end of the transformer winding due to the transformer action so that it does not interfere with the commutation of triac 53. The particular embodiment of the inverter shown in FIGURE 8 is particularly useful with a low voltage direct current power supply in that it makes available across capacitor 18 at least double the voltage of the direct current power supply. Further, this version of the inverter circuit requires only two load current carrying conducting devices, triacs 50, 53 in the particular illustration of FIGURE 8.

FIGURE 9 illustrates a fourth embodiment of a power circuit constructed in accordance with our invention and which is operable as a reverse output polarity time-ratio control or single-phase inverter circuit depending upon the sequence of turning on of the various controlled conducting devices. The power circuit of FIGURE 9 includes a first set of two series connected load current carrying triacs 61 and 62, and a second set of two series connected load current carrying triacs 63 and 64. Each of the two sets of triacs are connected across the terminals 15, 16 of a direct current supply source having the polarities indicated. A third set of two series connected commutating gate fired SCR's 65 and 66, and a fourth set of two series connected commutating gate fired SCR's 67 and 68 are interconnected by means of linear inductance 71 across power supply terminals 15 and 16. An inductive load circuit 17, or load device 17 and filter inductance 20 are connected between the junctures of load current carrying triacs 61, 62 and the juncture of load current carrying triacs 63, 64. In order to commutate the power circuit, capacitor 18 and inductor 19 are connected in series circuit relationship between the juncture of commutating SCR's 65, 66 and the juncture of commutating SCR's 67, 68. These four last mentioned commutating gate fired SCR's, which could also be $dv/dt$ fired SCR's are denoted as first commutating controlled rectifiers, a set of second commutating controlled devices being formed by two commutating gate fired triacs 69 and 70. The second commutating triac 69 is connected between the juncture of the first set of load current carrying triacs 61, 62, and the juncture of the first commutating controlled rectifiers 65, 66. The second commutating triac 70 is connected between the juncture of the second set of load current carrying triacs 63, 64 and the juncture of the first commutating controlled rectifiers 67, 68. A source of gating signals (not shown) is adapted to be connected to the gating electrode of each of the gate controlled triacs. A source of gating signals, or $dv/dt$ firing signals if $dv/dt$ SCR's are employed, is adapted to be employed for turning on these controlled conducting devices in the predetermined sequence as set forth below.

The time-ratio control circuit mode of operation of the circuit of FIGURE 9 will now be explained. Initially, load current carrying triacs 61 and 64 are turned on to thereby supply load current to the inductive load circuit. Later, at a predetermined time, SCR's 65 and 68 are turned on to charge capacitor 18 to double supply voltage as illustrated. Upon capacitor 18 being charged, SCR's 65 and 68 are automatically turned off. In order to commutate off triacs 61 and 64, commutating triacs 69 and 67 are turned on.

To obtain the coasting mode of operation, load current carrying triac 62 is first turned on whereby capacitor 18 discharges into the load circuit. Subsequently, triac 64 is refired to complete the load circuit path across terminal 16 and thereby obtain a coasting operation. Triacs 61 and 64 are then refired as initially to obtain the desired amount of load current supplied to the load circuit.

One of the primary advantages of the circuit of FIGURE 9 is that capacitor 18 may be charged at any time independent of the operating conditions of load current carrying triacs 61–64. The linear inductors 71 shown in dotted form, when used, allow the size of SCR's 65–68 to be smaller due to the lower peak current flowing therethrough.

The inverter circuit mode of operation of FIGURE 9 will not be described since it is believed that such operation is easily deduced from the time-ratio control circuit operation. tI should be noted, however, that since only a single capacitor-inductor commutating circuit is required by the arrangement shown in FIGURE 9, the inverter circuit is smaller in size and the charging and discharging of capacitor 18 is accomplished at twice the rate of either capacitor 18 or 18' in the previously described bridge inverter circuit of FIGURE 7. Hence, the circuit of FIGURE 9 can respond more quickly to changes in the conditions of loading.

A more detailed form of power circuit operable as a time-ratio control or single-phase power inverter circuit constructed in accordance with our invention is shown in FIGURE 10. The circuit of FIGURE 10 is similar in all major respects to the circuit of FIGURE 7 and differs therefrom in that it includes a number of cushioning networks including a resistor-capacitor transient limiting network which operate to limit or cushion the transient potentials developed across the triac devices of the circuit as they are rapidly switched on and off during operation of the power circuit. The circuit will be described in its inverter mode of operation since the time-ratio control mode of operation can easily be deduced therefrom as was seen with relation to the two modes of operation of the circuit shown in FIGURE 7. The bridge inverter circuit is comprised by two sets of two series connected load current carrying triacs 30', 31', and 30, 31 connected across the direct current power supply source having positive terminal 15 and negative terminal 16, and two sets of two series connected commutating triacs 32', 33' and 32, 33 also connected across the direct current power supply. The commutating triacs may be replaced by gate fired SCR's, if desired, and the cushioning networks to be described are also conveniently employed therewith. The junctures of the commutating triacs are each connected to a series circuit comprised by capacitor 18 and inductor 19, or capacitor 18' and inductor 19'. The load 17 to be supplied with an inverted square wave alternating current potential is connected between the juncture of the two sets of load current carrying triacs 30', 31', and 30, 31. In these respects, the circuit as shown in FIGURE 10 is identical to the circuit shown in FIGURE 7. The circuit differs, however, in the inclusion of a series connected resistor 73 and capacitor 74 connected in parallel circuit relationship with each of the commutating triacs 32, 33 and 32', 33'. Each of these networks serves as a transient suppression network for preventing large transient changes in potential from appearing across the commutating triacs instantaneously in that they serve to limit the rate of rise of these potentials to some value better accommodated by the commutating triacs. A similar resistor-capacitor cushioning network is connected across each of the load current carrying triacs 30, 31, 30', 31' and comprises a resistor 75 and parallel connected diode 76 connected in series with a capacitor 77 across each of the load current carrying triacs. In operation, the resistor-capacitor suppression network comprised by resistor 75, capacitor 77 and diode 76 serves to limit the rate of rise of transient potentials across the load current carrying triacs.

Figure 10A:
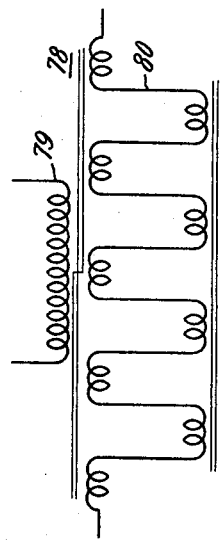
FIGURE 10A is a detailed diagram showing the actual manner in which the secondary windings of the cushioning transformer illustrated in FIGURE 10 are fabricated.

Additional transient cushioning effects are provided by a pair of saturable core transformers designated as a whole by numerals 78, 78' having the two ends of their primary windings 79 and 79' connected to the load current carrying triacs 30, 31 and 30', 31', respectively. The center-taps of the primary windings 79 and 79' are connected to respective sides of the load 17, and are also connected to the series connected inductor-capacitor commutating circuits 18, 19 and 18', 19', respectively. The secondary windings 80, 80' of the cushioning transformers are connected in series circuit relationship across the direct current power supply through a suitable current limiting resistor 81. A direct current (D.C.) bias current flowing in the secondary windings due to this connection causes the saturable transformer to be set in its negative saturation condition where the potential across the winding is positive at the dot end. Upon one of the load current carrying triacs, such as 30', being gated on, the full line potential will not be applied instantaneously across the remaining triac in the pair (31′) due to the reactive effect of the primary winding 79′ which holds off the line potential until capacitor 77 associated with triac 31′ is fully charged to a line potential. This reactive effect is produced by the current flowing in the winding 79′ partially resetting the core of the saturable transformer towards its positive saturation condition. Thereafter, during the following half cycle of operation, the D.C. bias current will return the core to its negative saturation condition to prepare it for the next half cycle of operation. Current flowing in the primary winding 79′ as a result of this setting action is returned through resistor 82′ and diode 83′. FIGURE 10A of the drawings shows the actual manner in which the secondary windings 80 of the cushioning transformer 78 are fabricated so that the same secondary windings 80 also are wound around a nonsaturating core which performs the function of a direct current choke. The primary winding 79 is wound around the saturating core only, and does not link the non-saturating core. In this way, the voltage induced in each segment of the secondary windings by the saturating core is cancelled by an equal but opposite polarity voltage induced in the adjacent segment of the secondary windings by the nonsaturating core, thereby preventing the buildup of very high voltages across the secondary windings.

Figure 19:
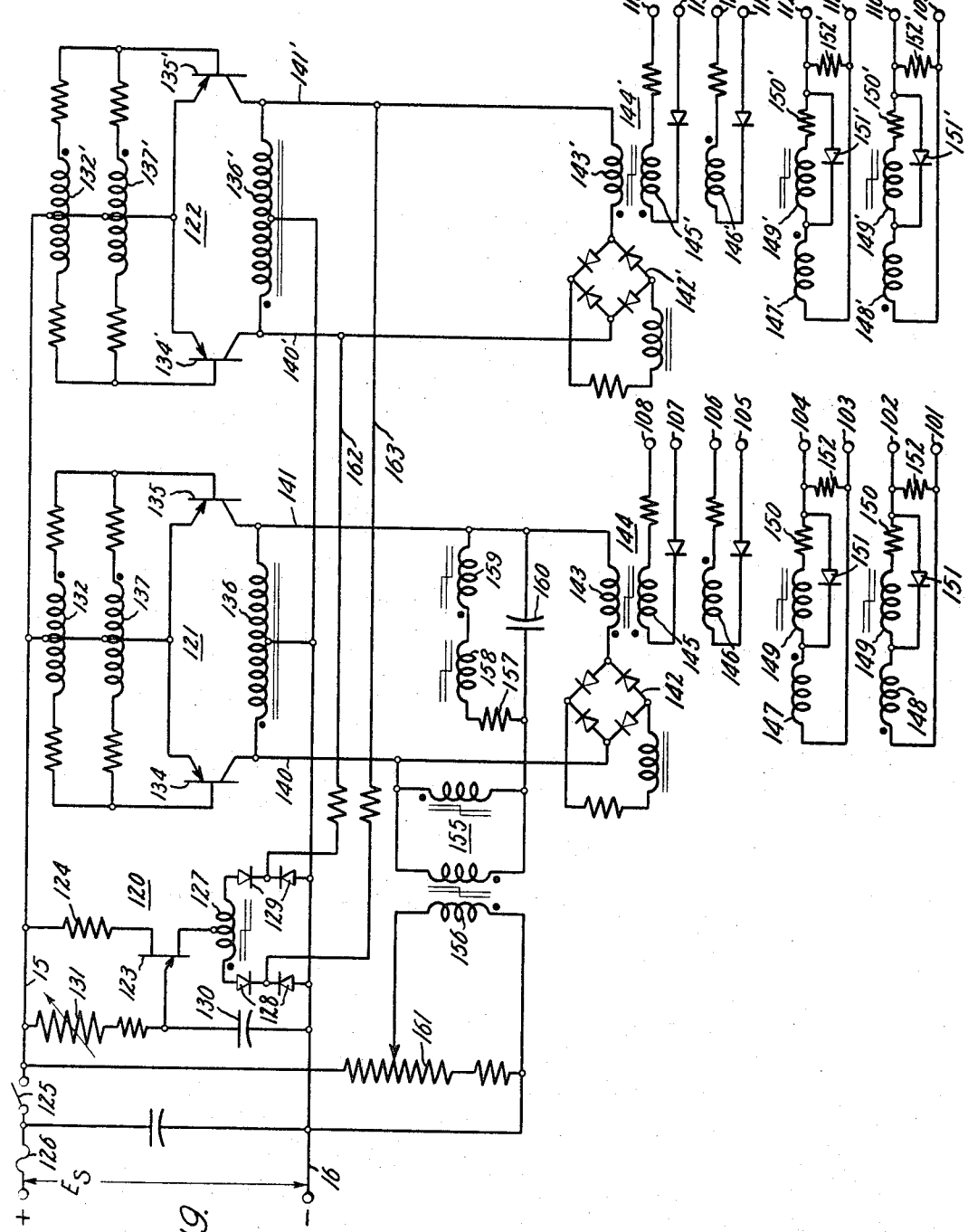
FIGURE 19 is a detailed circuit diagram of a gating signal source for use in controlling the operation of any one of the inverter circuits shown in FIGURES 7–18 when employing gate fired devices, and particularly for use in controlling the operation of the bridge type inverter circuits illustrated in FIGURES 7, 9, 10, 15 and 16.

In operation, the inverter circuit mode of operation of FIGURE 10 functions in an identical manner to the inverter circuit mode of operation of FIGURE 7 by gating on selectively the load current carrying triacs by means of a gating signal source, such as that shown in FIGURE 19, connected across respective gating electrodes and terminals of the triacs. Load current is supplied to the load device 17 by gating on each pair of diametrically opposite load current carrying triacs such as 30, 31′ or 30′, 31. By varying the periods of time during which these pairs of load current carrying triacs are conducting, the magnitude of the load currents supplied can be readily controlled. Commutation of conduction through the load current carrying triacs is achieved in the identical manner to that described with relation to FIGURE 7, that is, through discharge of the respective associated charging capacitor 18 or 18′ through its inductor 19 or 19′ and commutating triacs 32, 33 or 32′, 33′. Hence, the commutation operation will not again be described in detail. During operation of the inverter, the resistor-capacitor and saturating transformer transient suppressing networks function in the same manner described to limit the rate of rise of potential across the various triacs when they are in their blocking condition so as to insure against a breakdown of these triacs and maximize efficient operation of the circuit.

A gating signal source suitable for use with the bridge inverter of FIGURE 10 is shown in FIGURE 19. The gating signal source of FIGURE 19 is comprised by a low power unijunction transistor-oscillator circuit designated as a whole by numeral 120 and two low power transistor-inverter circuits 121 and 122 which function to supply inverted square waves from a direct current power supply source through assorted saturable reactors to develop time delayed pulses and square waves suitable for use in gating on the various triacs of the bridge inverter of FIGURE 10. In the oscillator circuit 120, a unijunction transistor 123 has one of its base electrodes connected through a resistor 124 to the positive terminal 15 of a direct current power supply provided with an ON-OFF switch 125 and a suitable fusing device 126. The remaining base electrode of unijunction transistor 123 is connected to a mid-tap point of a saturable reactor 127. The saturable reactor 127 has one of its ends connected through a pair of opposed series connected diode rectifiers 128 to the negative terminal 16 of the direct current power supply and has the remaining end thereof connected through a similar set of opposed series connected diode rectifiers 129 to the negative terminal. The junction points of the two opposed series connected diode rectifiers 128 and 129 are each adapted to have gating potentials applied thereto as will be described more fully hereinafter for gating open either one or the other set of rectifiers to selectively connect one end or the other of the saturable reactor 127 to the negative terminal 16. The emitter-electrode of unijunction transistor 123 is connected to a voltage dividing circuit comprised by a capacitor 130 and a variable resistor 131 which can be adjusted to control the frequency of operation of the unijunction transistor-oscillator circuit comprised by the components described above.

The saturable inductor 127 has an inductively coupled secondary winding 132 which has its mid-tap point connected to the positive terminal 15 of the direct current power supply, and has each of its ends connected through suitable current limiting resistors to the base electrodes of a pair of PNP transistors 134 and 135. The transistors 134 and 135 coact to form the low power transistor-inverter circuit 121, which further includes a transformer in which the primary winding 136 is connected between the collector-electrodes of each of the transistors 134 and 135 and has its mid-tap point connected to the negative terminal 16 of the direct current supply. The emitter-electrodes of transistors 134 and 135 are interconnected in common at the mid-tap point of the secondary winding 132 of saturable reactor 127 and at the mid-tap point of the secondary winding 137 of a transformer having primary winding 136 wherein secondary winding 137 has its end points likewise connected through current limiting resistors to the base electrodes of transistors 134 and 135, respectively. The transistor-inverter 121 is conventional in construction and operation, and hence will not be described in detail. Briefly, however, the circuit is biased to a point so that the addition of a small voltage inductively coupled into the secondary winding 132 from the saturable inductor 127 of the unijunction transistor-oscillator 120 is adequate to gate on either one or the other of the PNP transistors 134 or 135 whichever is in the non-conducting state. For example, assuming a negative polarity gating signal is applied to the junction of diode rectifiers 128 allowing conduction to take place through unijunction transistor 123 and the dot end of saturable inductor 127, then a voltage will be induced in the secondary winding 132 which will be positive at the no dot end of that winding. This will be adequate to turn off transistor 134 and allow transistor 135 to conduct. Conduction through transistor 135 causes current to flow through the no dot end of transformer primary winding 136, which is inductively coupled back to secondary winding 137 in a manner such that the current flow in this winding 137 further increases the positive polarity at the no dot end of this winding, and hence the positive polarity potential applied to the base electrode of transistor 134 essentially drives this transistor into cutoff and turns transistor 135 full on. This condition of operation will continue until such time that another gating pulse is supplied from saturable inductor 127 of the unijunction transistor-oscillator 120 due to conduction through diode rectifiers 129 and through the no dot end of saturable inductor 127. This switching potential will then reverse the condition of operation so that transistor 134 is turned full on, and transistor 135 is essentially driven into cutoff. The resulting output from the low power transistor-inverter 121 is a square wave potential which is supplied across conductors 140 and 141 to a current limiting circuit, comprised by a diode rectifier bridge 142 and resistor-inductor network thereacross, and to the primary winding 143 of a saturable transformer 144. The transformer 144 has secondary windings 145 and 146 which are connected through suitable current limiting resistors and blocking diodes to output terminals 105–108 that are connected to terminals and gating electrodes of the commutating triacs 32, 33 in the circuit of FIGURE 10 at the points indicated by the identical numerals 105–108 associated therewith. Transformer primary winding 136 is also inductively coupled to additional secondary windings 147 and 148 that, in turn, are connected to respective wave forming circuits. The wave forming circuits are each comprised by a saturable inductor 149 and series connected resistor 150 connected in parallel with a diode rectifier 151 and a load resistor 152 connected across output terminals 101–104 to similarly identified terminal points on the load current carrying triacs 30, 31 of the bridge inverter circuit of FIGURE 10. The potentials appearing across secondary windings 147 and 148 are essentially square wave in nature but the rise in potential at the output terminals 101–103 is delayed somewhat due to the wave shaping effect of the saturable inductor 149 and its associated circuitry, while the potentials appearing across secondary windings 145 and 146 of saturable transformer 144 are essentially pulsed in nature.

In addition to the gating potentials supplied to the output terminals 101 through 108, the low power transistor-inverter circuit 121 supplies a triggering potential to the second low power transistor-inverter circuit 122. This is accomplished through a parallel connected magnetic amplifier 155, of conventional construction, which is connected in series circuit with a pulse shaping circuit formed by a resistor 157, a first saturable reactor 158, and a second saturable reactor 159 connected in parallel with a capacitor 160 between the two conductors 140 and 141. The magnetic amplifier 155 has its control winding 156 connected across a variable resistor 161, that, in turn, is connected across the D.C. supply source. The variable resistor 161 controls the phasing at which the parallel connected magnetic amplifier cores saturate so that the amplifier supplies a signal pulse to the pulse shaping circuit formed by the two saturable reactors 158 and 159. These two reactors serve to form the signal pulse supplied thereto into a sharp triggering pulse which is inductively coupled to the secondary winding 132' of the saturable reactor 159 in order to switch the second low power transistor-inverter circuit 122.

The second low power transistor-inverter circuit 122 is identical in construction and operation to the first low power transistor-inverter circuit 121, and hence will not be described again in detail. The square wave potential appearing across its output conductors 140' and 141' is likewise supplied through a current limiting circuit comprised by diode rectifier bridge 142' and a resistor-inductor network thereacross to the primary winding 143' of a saturable transformer 144', and thence to the output terminals 113–116 connected to terminals and gating electrodes of commutating triacs 32', 33' of the bridge inverter circuit of FIGURE 10. Similarly, the transformer primary winding 136' is inductively coupled to the two secondary windings 147' and 148' to provide square wave potentials at the output terminals 109–112 connected to terminals and gating electrodes of load current carrying triacs 30', 31'. It should be noted that these square wave potentials will be delayed in phase with respect to the potentials at output terminals 101–104 for a predetermined period equal to the pulse width of the square wave output potential desired from the bridge inverter circuit of FIGURE 10, and as determined by the setting of the variable resistor 161. Additionally, it should be noted that the potentials appearing across conductors 140', 141' are supplied back through conductors 162, 163 back to the junction of the diode rectifiers 128 and 129 to gate these rectifiers on and off as determined by the polarities of the potentials appearing across conductors 140' and 141'. In this manner, the operation of the gating signal source will be synchronized so that properly phased square wave potentials and gating signal pulses are applied in the proper time sequence to the gating electrodes of the gate controlled triacs in the bridge inverter circuit of FIGURE 10.

A fifth embodiment of a power circuit operable as a reverse output polarity time-ratio control or single-phase inverter circuit constructed in accordance with our invention is shown in FIGURE 11 of the drawings. The power circuit includes a commutating bidirectional controlled conducting diac 170 connected in series circuit relationship with commutating capacitor 18 and inductor 19. The series circuit thus formed is connected to a mid-tap point of a direct current power supply source, and to the juncture of a pair of series connected load current carrying diacs 38 and 39 connected in series circuit relationship across the terminals 15, 16 of a direct current power supply. A load device 17 is connected across the series circuit comprised by capacitor 18, commutating diac 170 and inductor 19. For the purpose of rendering diacs 38, 39 conducting by the technique known as $dv/dt$ firing, small saturable reactors 173 are connected in series circuit relationship between diacs 38 and 39. The small reactors each serve a pulse shaping function in that their presence steepens the trailing edge of a square wave firing pulse applied across diacs 38 and 39 from a $dv/dt$ signal or firing pulse source (not shown), thereby assuring that the firing voltage is removed from the nongate turn-on diacs as quickly as possible after they turn on. Isolation between the two firing circuits is achieved by means of a pair of isolation capacitors 174 connected between the power supply terminals 15, 16 and the juncture of the small saturable reactors 173. Suitable filtering components may be connected in the load circuit; thus, inductor 20 may be connected in series with load 17 and, or, filter capacitor 176 may be connected in parallel circuit relationship therewith, such particular filtering elements being shown in FIGURE 11 by dotted line. Obviously, any conventional filtering circuit may be employed with the particular load device 17 in FIGURE 11, or, may similarly be employed with the load 17 in the circuits of the figures hereinbefore or hereinafter described.

In operation, the circuit of FIGURE 11 functions somewhat similar to the power circuit of FIGURE 7, and is thus operable either as a reverse output polarity time ratio control or inverter power circuit, depending upon the sequence of the firing of the various controlled conducting devices. The power circuit of FIGURE 11 will now be described with relation to its inverter mode of operation, it being understood that the time-ratio control mode of operation may be easily determined therefrom. The operation of circuit of FIGURE 11 requires that suitable $dv/dt$ pulses be supplied across the terminals of each of diacs 170, 38 and 39 from a $dv/dt$ signal source in a manner such that diacs 170 and 38 are first turned on in a direction whereby load current is supplied from the positive power supply terminal 15, through load current carrying diac 38, reactor 173 to load 17. Diac 170 is rendered conductive in a direction therethrough from point 178 to 177. Upon the occurrence of load current being supplied to load 17, the potential at point 179 will approximately equal that of the positive terminal 15 of the direct current power supply. This will effectively charge capacitor 18 through inductor 19 and diac 170 to a potential approximately equal to $E_s$ or twice the direct current power supply potential from the centertap to the positive terminal 15. Thereafter, in order to commutate off load current carrying diac 38, the turn-on signal previously employed across the terminals of diac 170 is removed and a turn-on signal of opposite polarity impressed thereacross such that diac 170 thence conducts in a direction from terminal 177 to 178. Upon diac 170 being turned on in a direction of conduction from point 177 to 178, the charge on capacitor 18 discharges through inductor 19 and diac 38 in an oscillatory manner thereby turning diac 38 off. During the commutation of diac 38, the potential at point 178 initially rises immediately to approximately equal that of point 177, and thereafter the two potential drop down due to discharge of capacitor 18 through the now-conducting diac 170 to some intermediate value at which point in time the second load current carrying diac 39 is turned on by a $dv/dt$ signal supplied from the $dv/dt$ signal source. Upon diac 39 conducting, the polarity of the potential at point 179 immediately drops to approximately equal the full negative value of the direct current power supply so that capacitor 18 will be charged in the reverse direction negatively in order to be in condition to commutate off load current carrying diac 39 at the end of its conducting interval. At the end of the conduction period of diac 39, commutating diac 170 is turned on again from the $dv/dt$ signal source such that disc 170 conducts in a direction from point 178 to point 177. Upon this occurrence, the potential at point 178 will rise immediately to approximately equal the potential at point 177 and thereafter the potentials of both points will drop down to approximately equal zero as capacitor 18 is discharged through diac 170, inductor 19, saturable reactor 173 and diac 39 to thereby commutate off diac 39. At this point in time, the first mentioned load current carrying diac 38 is again turned on by the $dv/dt$ signal source in a direction to cause conduction from terminal 15 to saturable reactor 173 so that the process is again carried out thereby completing the cycle of operation. The chief advantage of the power circuit of FIGURE 11 is that it does not require that load current supplied to load 17 flow through any commutating inductor. Hence, better efficiency and beter voltage regulation can be obtained from the circuit than would otherwise be the situation. Additionally, it should be noted that the commutating voltage built up on capacitor 18 will be proportional to the load voltage. This circuit is not quite as efficient in operation as the species of circuits shown in the previous figures, however, in that it does not recirculate the charge an capacitor 18 back into the capacitor at the end of the commutating interval to recharge the capacitor in the reverse direction for the next commutating cycle. Instead, capacitor 18 must be charged in advance of each commutating cycle from the power source. Since one terminal end of load 17 remains at a fixed potential throughout the successive periods of operation, the peak-to-peak voltage of the alternating current voltage developed across load 17 in the inverter mode of operation is equal to the supply voltage $E_s$ which exists across terminals 15 and 16.

Figure 12:
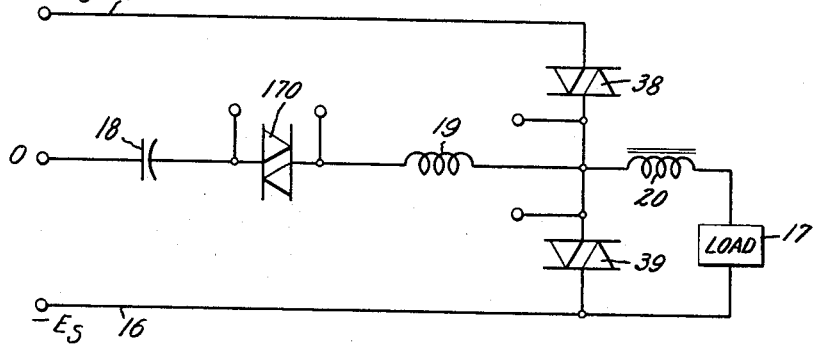
FIGURE 12 is a modification of the circuit shown in FIGURE 11 and is operable as a time-ratio control power circuit in a bidirectional power flow mode.

FIGURE 12 of the drawings illustrates a modification of the power circuit shown in FIGURE 11 and is operable only as a single output polarity time-ratio control power circuit adapted to provide a bidirectional power flow. Since the commutating diac 170 of FIGURE 12 functions to commutate off either load current carrying diac 38 or 39, depending upon the particular mode of operation of the time-ratio control power circuit, it is believed unnecessary to further describe the operation of the circuit. Suffice it to say that diac 38 may be rendered conductive to supply electric current to load 17 or to feed current back from load 17 to the power supply. In like manner, load current carrying diac 39 can operate in a coasting mode to circulate the load current within the diac 39 load 17 loop in a clockwise direction as viewed by the reader or may be rendered conducting in an opposite direction to permit the pump back or feedback mode of operation of diac 38 as described with reference to the circuit of FIGURE 4. The primary distinction between the circuits of FIGURES 11 and 12 are the connection of the load circuit. Thus, in the circuit of FIGURE 11, the load circuit is connected in parallel with the commutating circuit and connected to the center-tap point of the power supply, whereas in FIGURE 12, the load circuit is connected in parallel with diac 39 in the manner of the single output polarity time-ratio control power circuits illustrated in FIGURES 1, 4 through 6. It should be understood that the small saturable reactors 173 and isolating capacitors 174 are also preferably employed in the all-diac circuit of FIGURE 12 but have been omitted merely for reasons of simplification.

As was stated with relation to FIGURE 6, the circuit of FIGURE 12 is also operable in a unidirectional power flow mode, but a more economically practical version of such unidirectional power flow circuit utilizes an SCR (gate turn-on or $dv/dt$ fired) for diac 38, a coasting diode for diac 39, and a commutating diode connected in reverse polarity relationship across the SCR.

Figure 13:
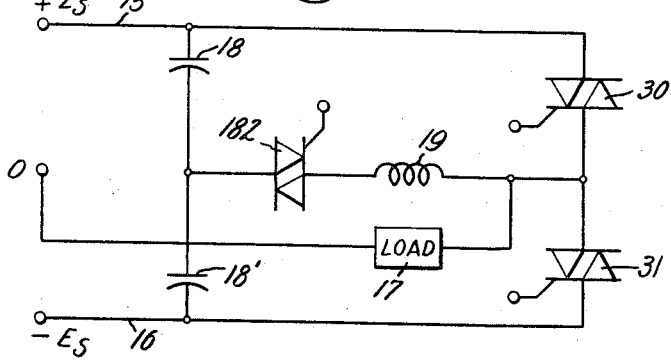
FIGURE 13 is a detailed circuit diagram of the preferred embodiment of our inverter circuit and illustrates a sixth embodiment of a power circuit operable as a time-ratio control or single-phase inverter circuit; and further illustrates a second form of power circuit employing a center-tap power supply which is constructed similar to the circuit shown in FIGURE 11.

FIGURE 13 of the drawings illustrates a sixth embodiment of a power circuit operable as either a reverse output polarity time-ratio control power circuit or inverter circuit depending upon the sequence of firing of the various controlled conducting devices, in this case triacs. As an inverter circuit, the embodiment of FIGURE 13 is our preferred one. The power circuit of FIGURE 13 is similar to that of FIGURE 11 in that a center-tap power supply is employed and the load 17 is connected thereto. In FIGURE 13, a pair of series connected load current carrying triacs 30 and 31 are connected across a direct current power supply source having terminals 15 and 16. A commutating circuit for commutating off the load current carrying triacs is comprised by a pair of capacitors 18 and 18' connected in series circuit relationship across the direct current power supply source. A commutating triac 182 is connected in series circuit with commutating inductor 19, and the series circuit thus comprised is connected between the juncture of the two load current carrying triacs 30 and 31, and the juncture of the two commutating capacitors 18 and 18'. A suitable load circuit 17, which may comprise a load device and filter circuit is connected between a mid-tap point on the power supply source and the juncture of the load current carrying triacs. In operation, the circuit of FIGURE 13 is almost identical to the operation of the circuit of FIGURE 11 with the exception that the separate capacitors 18 and 18' each have about half the value of capacitance of the single capacitor 18 in the circuit of FIGURE 11.

Figure 14:
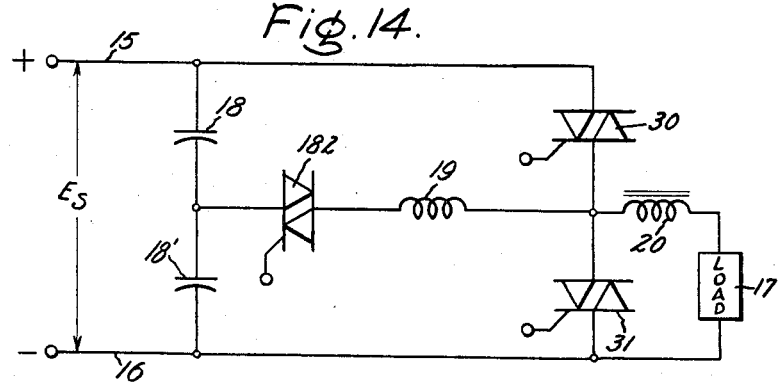
FIGURE 14 is modification of the circuit shown in FIGURE 13 and illustrates the preferred embodiment of our time-ratio control power circuit when operable in a bidirectional power flow mode.

FIGURE 14 of the drawings is a modification of the circuit shown in FIGURE 13 and is operable only as a single output polarity time-ratio control power circuit adapted to provide a bidirectional power flow. The FIGURE 14 embodiment is our preferred form of the time-ratio control power circuit. The circuit of FIGURE 14 is identical in all respects with that of FIGURE 13 except for the connection of the load circuit, the load circuit being connected in parallel with load current carrying triac 31 in FIGURE 14 rather than being connected to the center-tap of the power supply as in FIGURE 13. Since the operation of the time-ratio control power circuit of FIGURE 14 is identical to that of the operation of such circuit in FIGURE 13, it is believed unnecessary to again describe this operation.

As in the case of FIGURES 6 and 12, the circuit of FIGURE 14 is also operable in a unidirectional power flow mode, but a more economically practical circuit therefor employs an SCR (gate turn-on or $dv/dt$ fired) for triac 30, a coasting diode for triac 31, and a commutating diode in reverse polarity relationship across the SCR.

Figure 15:
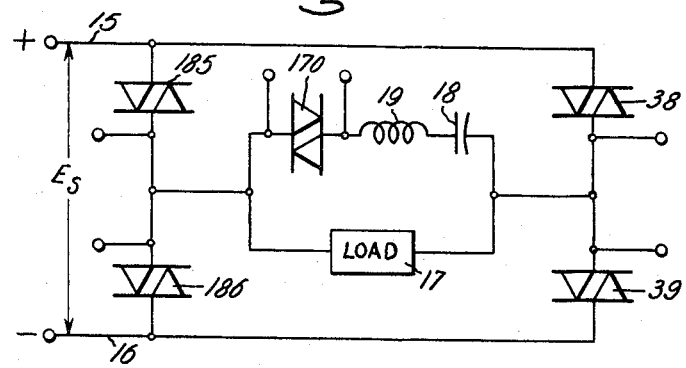
FIGURE 15 is a detailed circuit diagram of a seventh embodiment of a power circuit operable as a time-ratio control or single-phase bridge inverter circuit and commutation circuit therefor.

FIGURE 15 is a detailed circuit diagram of a seventh embodiment of a power circuit operable as either a reverse output polarity time-ratio control power circuit or single-phase bridge inverter circuit, depending upon the sequence of firing the controlled conducting devices employed therein. The bridge circuit of FIGURE 15 is similar in many respects to the circuit of FIGURE 11 but includes a second set of two series connected load current carrying diacs 185 and 186 connected across the direct current power source terminals 15 and 16. In all other respects, the circuits of FIGURES 15 and 11 are identical, the small saturable reactors 173 and isolating capacitors 174 of the FIGURE 11 circuit being omitted in FIGURE 15 for the sake of simplicity.

In operation, the time-ratio control power circuit modes of FIGURES 11 and 15 are identical. In the bridge inverter circuit mode of operation, load current is caused to flow through load 17 by having two of the load current carrying diacs such as 38 and 186 turned on concurrently.

For this reason, a *dv/dt* signal source (not shown) is used with the bridge inverter circuit of FIGURE 15 to turn on diacs 38 and 186, commutate off 38 and 186, turn on 39 and 185, and commutate off 39 and 185, and this cycle is then repeated. In this manner, load 17 is alternately connected from one side of the direct current power supply to the other thereby causing a square wave alternating current potential to be developed across the load having a peak-to-peak amplitude equal to twice the power supply voltage $E_s$. In commutating off the load current carrying triacs, commutating diac 170 will be turned on in a direction to conduct from the juncture of diacs 185 and 186 to inductor 19 in turning off load current carrying diacs 38 and 186, and will be turned on in the opposite direction in commutating off diacs 39 and 185. In other respects, the commutation operation is similar to that described with the power circuit shown in FIGURE 11 in that the turning on of commutating diac 170 in a direction of conduction from the juncture of diacs 185 and 186 to inductor 19 will cause the charge on capacitor 18 to be discharged back through diac 38, then through the direct current supply and diac 186 to thereby turn them off. For the next commutation cycle, commutating capacitor 18 must be precharged in a reverse polarity direction and this occurs upon the load current carrying diacs 39 and 185 being turned on as outlined in the sequence of operations set forth above.

Figure 16:
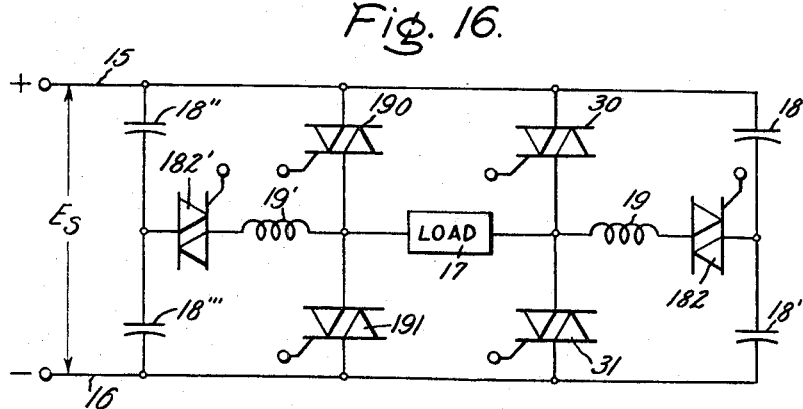
FIGURE 16 is a detailed circuit diagram of an eighth embodiment of a power circuit operable as a time-ratio control or single-phase bridge inverter circuit and commutation circuit therefor.

A modified power circuit operable as a reverse output polarity time-ratio control or single-phase bridge inverter circuit and constructed along the lines of the circuit shown in FIGURE 13 is shown in FIGURE 16. The circuit of FIGURE 16 may be described as comprising two single-phase inverter circuits of the type disclosed in FIGURE 13 which are interconnected through the load circuit 17. Because each of the single-phase inverter circuits is identical in construction and operation to that described with relation to FIGURE 13 of the drawings, it is not believed necessary to describe the full wave bridge inverter or time-ratio control power circuits of FIGURE 16 in detail. It should be noted, however, that the load circuit 17 to be supplied with square wave alternating current power in the inverter mode of operation is connected between the juncture of two load current carrying triacs 30, 31 and the juncture of two load current carrying triacs 190 and 191. A gating signal source such as that shown in FIGURE 19 is connected to the controlled gate elements of each of the load current carrying triacs and commutating triacs 182 and 182' for turning on the gate controlled devices in a predetermined time sequence whereby load 17 will have its terminals alternately connected from one side of the power supply line to the other. Since the commutation operation required to turn off the load current carrying triacs 30, 31, 190, 191 is identical to the commutation operation described with relation to the circuit shown in FIGURE 13 of the drawings, a further description of the operation is believed unnecessary.

Figure 17:
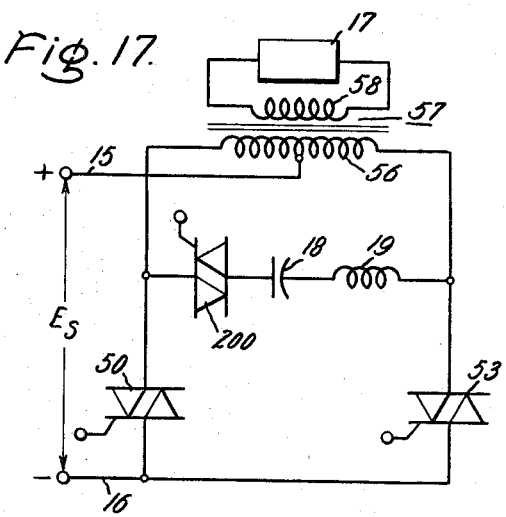
FIGURE 17 is a detailed circuit diagram of a ninth embodiment of a power circuit operable as a single-phase inverter circuit and commutation circuit therefor.

A center-tap load transformer inverter circuit similar to that illustrated in FIGURE 8 is shown in FIGURE 17 of the drawings. The inverter circuit of FIGURE 17 is formed by a transformer 57 having its secondary winding 58 connected to a suitable load device 17. The primary winding 56 of the transformer has each of its end terminals connected through respective load current carrying triacs 50 and 53 to the negative terminal 16 of a direct current supply source. The mid-tap point of primary winding 56 is connected to the positive terminal 15 of the direct current supply source. A commutating circuit portion is provided which includes triac 200 connected in series circuit relationship with commutating capacitor 18 and commutating inductor 19. The series circuit thus formed is connected across the primary winding 56 of load transformer 57.

In operation, upon one of the load current carrying triacs such as 50 being gated on by a gating signal source (not shown), one of the end points of the primary winding 56 will be connected to the negative terminal of the direct current power supply, and since the mid-tap point is always connected to the positive terminal, a current of a given polarity will be induced in the secondary winding 58 and applied to load 17. Thereafter, in order to turn off the load current carrying triac 50, commutating triac 200 is turned on in a direction so as to conduct from the juncture of triac 50 at one end of transformer primary winding 56 to capacitor 18. The charge built up on capacitor 18, in the meantime, is allowed to discharge through load current carrying triac 50 to cause it to be commutated off. Concurrently, the remaining load current carrying triac 53 is turned on so that conduction then occurs through the remaining half of the primary winding 56 thereby inducing a current of opposite polarity in the secondary winding 58 which is supplied to load device 17. The circuit of FIGURE 17 has the particular advantage of not requiring a center-tapped direct current power supply and utilizes only three controlled conducting devices. Otherwise, the advantages of the circuit are much of the same as those outlined in connection with the circuit of FIGURE 11, namely that the load current need not be supplied through a commutating inductor, and hence, losses in the circuit are reduced to a minimum.

Figure 18:
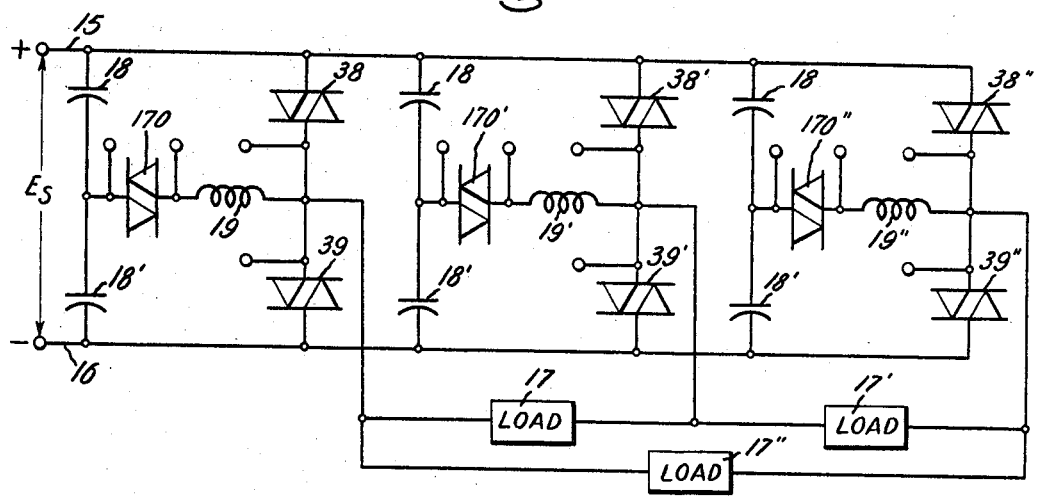
FIGURE 18 is a detailed circuit diagram of a tenth embodiment of a power circuit operable as a time-ratio control or three-phase inverter circuit and commutation circuit therefor.

A tenth embodiment of a power circuit constructed in accordance with our invention is illustrated in FIGURE 18 and is operable as a reverse output polarity time-ratio control or three-phase inverter power circuit depending upon the particular sequence of firing of the diac devices therein. The circuit of FIGURE 18 when operable as a three-phase inverter circuit employs three separate single-phase inverter circuits identical in construction and operation to the single-phase inverter circuit described with relation to FIGURE 13 of the drawings with the exception that diacs are employed instead of triacs. A load element 17 is connected between the juncture of two load current carrying diacs 38 and 39, and the juncture of two other load current carrying diacs 38' and 39'. A second load element 17' is interconnected between the junctures of diacs 38' and 39' and the juncture of two other load current carrying diacs 38'' and 39''. Finally, the three-phase load is completed by a remaining load element 17'' that is interconnected between the juncture of diacs 38 and 39 and the juncture of diacs 38'' and 39''. In operation, a *dv/dt* turn-on signal source (not shown) is connected across the terminals of each of the load current carrying diacs and commutating diacs 170, 170' and 170'' to turn on each of these devices in a predetermined time sequence whereby load current will be supplied through each of the load elements 17, 17' and 17''. During the commutating period, the commutating diacs 170, 170' and 170'' will function in the manner described with relation to FIGURE 13 of the drawings to commutate off proper ones of the load current carrying diacs.

Figure 20:
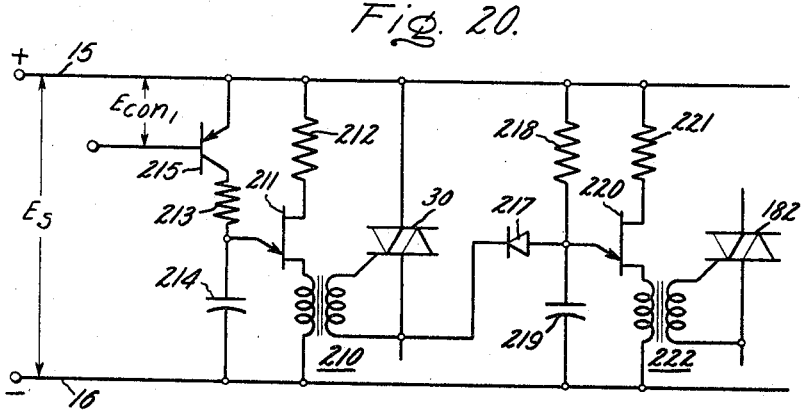
FIGURE 20 is a detailed circuit diagram of a gating signal source for use in controlling the operation of any one of the gate fired time-ratio control power circuits.

FIGURE 20 of the drawings illustrates the construction of a gating circuit hereinbefore described as a source of gating signals, suitable for use with any of the previously illustrated time-ratio control power circuits employing gate turn-on devices as controlled conducting elements. In FIGURE 20, a load current carrying triac 30 (being particularly referenced to the time-ratio control power circuit of FIGURE 14) has its gate electrode connected to the secondary winding of a pulse transformer 210. The primary winding of pulse transformer 210 is connected between one base of a unijunction transistor 211 and the negative terminal 16 of the direct current power supply. The remaining base of the unijunction transistor 211 is connected through a voltage limiting resistor 212 to the positive terminal 15 of the direct current power supply. The emitter electrode of the unijunction transistor 211 is connected to the junction of a resistor 213 and capacitor 214 connected in series circuit relationship between the negative terminal 16 and the collector electrode of PNP transistor 215. The transistor 215 has its emitter electrode connected directly to the positive terminal 15, and its base electrode is connected to a source of direct current control voltage $E_{con1}$ for controlling the phasing of the time of firing (turning on) of the load current carrying triac 30.

In order to control the time of firing of commutating triac 182 at a fixed phase relationship with respect to the time of firing of the load current carrying triac 30, the cathode of a blocking diode 217 is connected to a terminal of triac 30. The blocking diode 217, in turn, has its anode connected to the juncture of a resistor 218 and capacitor 219 connected in series circuit relationship across terminals 15 and 16. The juncture of resistor 218 and capacitor 219 is also connected to the emitter electrode of a unijunction transistor 220 which has one base connected through a resistor 221 to the positive terminal 15, and the remaining base connected through the primary winding of a pulse transformer 222 to the negative terminal 16. The secondary winding of the pulse transformer 222 is connected to the gate electrode of the commutating triac 182.

By reason of the above-described arrangement and nature of the unijunction transistors 211 and 220 which are avalanche devices in that they are rendered fully conducting upon the base to emitter voltage of the device reaching a predetermined level, gating pulses will be produced in the secondary windings of the pulse transformers 210 and 222 in the following manner: The direct current control voltage $E_{con1}$ applied to the base electrode of the PNP transistor 215 causes this transistor to vary the value of the resistance of the resistor-capacitor network comprised by resistor 213, capacitor 214. This results in varying the rate at which capacitor 214 is charged to a value sufficient to trigger on the unijunction transistor 211. Upon the unijunction transistor 211 being triggered on, a gating pulse will be produced in the secondary winding of pulse transformer 210 which turns on the load current carrying triac 30. Upon the load current carrying triac 30 being turned on, the juncture of triac 30 and triac 31 (in FIGURE 14) is driven to the positive potential of terminal 15 so that blocking diode 217 is rendered blocking. Upon diode 217 being blocked, capacitor 219 will be charged up through resistor 218 towards the potential of terminal 15 at a rate determined by the time constant of resistor 218 and capacitor 219. This charging rate can be designed to provide a sufficient potential across capacitor 219 at a predetermined time interval after load current carrying triac 30 is turned on to cause the unijunction transistor 220 to be turned on. This results in producing a gating pulse in the secondary winding of pulse transformer 222 to thereby turn on commutating triac 182 at the desired fixed interval of time after load current carrying triac 30 was turned on. This particular source of gating signals, the circuit of FIGURE 20, thus provides a fixed time mode of operation of turning off a load current carrying gate turn-on device.

Figure 21:
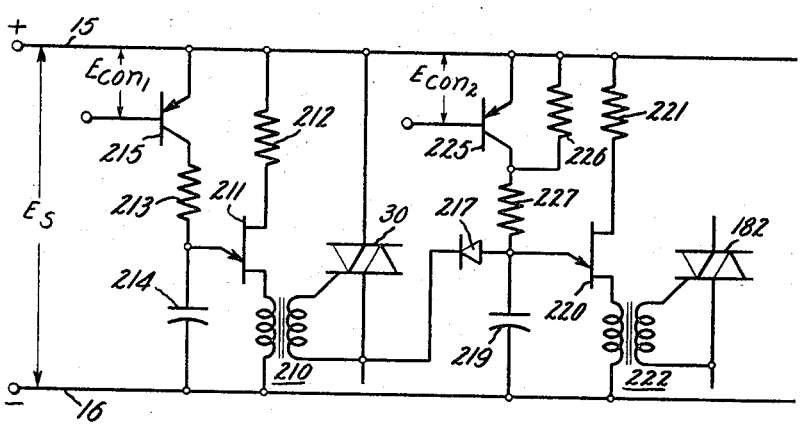
FIGURE 21 is a detailed circuit diagram of a modification of the gating circuit shown in FIGURE 20 to provide independent control over the commutation operation as well as independent control of the turn-on of the load current.

FIGURE 21 of the drawings illustrates a variation of the source of gating signals circuit shown in FIGURE 20 wherein independent control is provided over the firing of the commutating triac 182, that is, a variable frequency mode of operation may be obtained. This independent control of the firing of commutating triac 182 is achieved by the substitution of an additional PNP transistor 225 paralleled by a resistor 226 and connected in series circuit relationship with resistor 227 in place of the fixed resistor 218 shown in FIGURE 20. By this modification, variation of the conductance of transistor 225, resistor 226, and resistor 227 thereby varies the charging rate of capacitor 219. This, in turn, varies the time at which the unijunction transistor 220 is turned full on resulting in gating on the commutating triac 182 with respect to the turn-on time of the load current carrying triac 30. If desired, other forms of suitable firing circuits for the power circuit arrangements described may be used, such as those disclosed in Chapter 9, entitled, "Inverter and Chopper Circuits," of the Silicon Controlled Rectifier Manual, published by the General Electric Company, Rectifier Components Department, copyrighted in 1961.

The output of a power circuit employing the gating circuit shown in FIGURE 20 may thus be changed only by varying the frequency of turn-on of triac 30, that is, by changing the magnitude of the direct current voltage $E_{con1}$. The output of a power circuit employing the gating circuit shown in FIGURE 21, however, may be changed by varying the "on" time or "off" time, or both, of triac 30, thereby permitting a change in the output at either constant or variable frequency, that is, by changing the magnitude of the direct current voltages $E_{con1}$ and $E_{con2}$.

Figure 22:
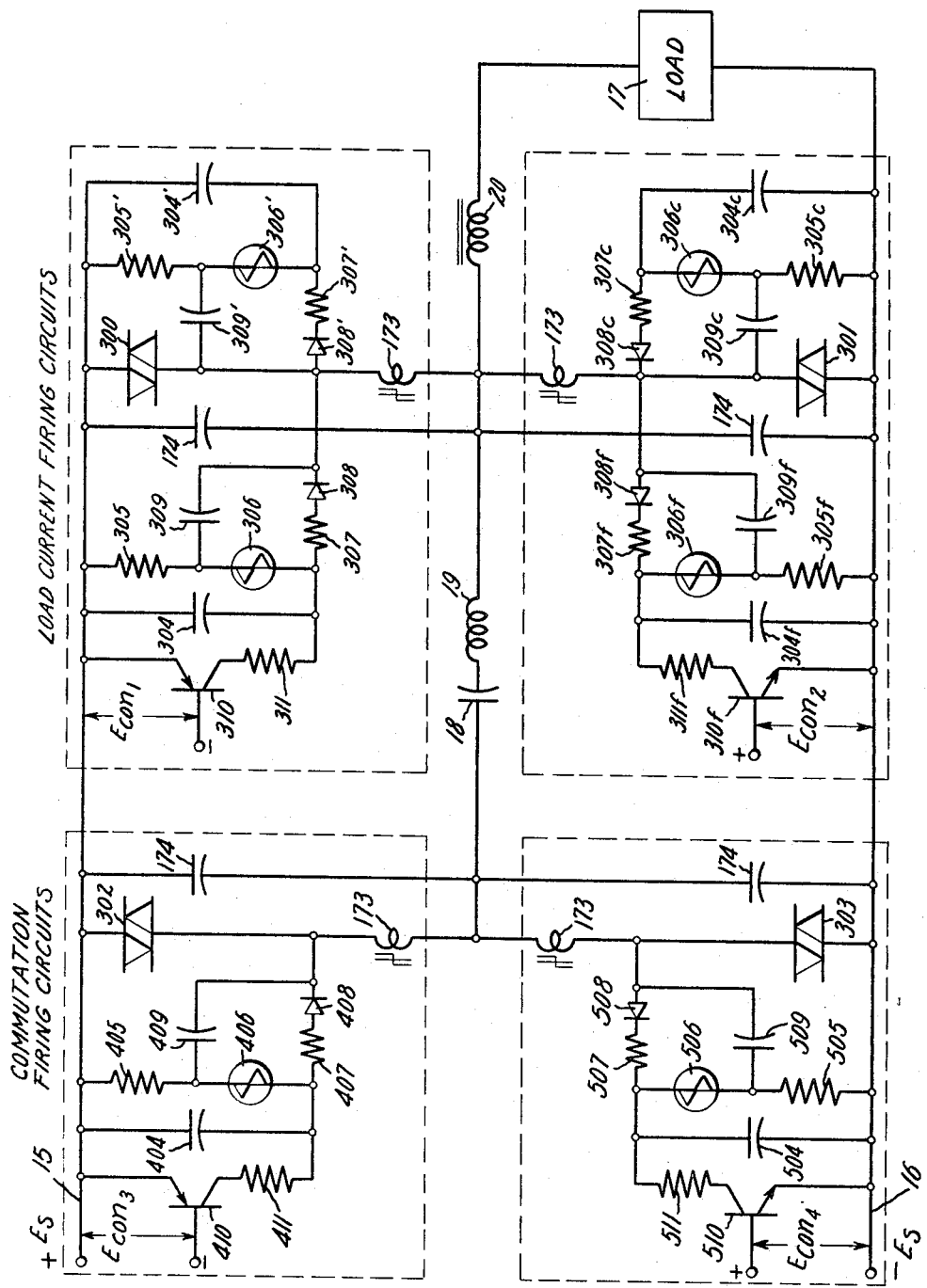
FIGURE 22 is a detailed circuit diagram of a $dv/dt$ signal source for use in controlling the operation of any of the $dv/dt$ fired time-ratio control power circuits shown in FIGURES 1–18.

FIGURE 22 of the drawings illustrates the construction of a $dv/dt$ signal source suitable for use with any of the previously illustrated time-ratio control power circuits employing nongate turn-on devices as controlled conducting elements. In FIGURE 22, two load current carrying diacs 300 and 301 are shown connected in a circuit similar to that of FIGURES 1, 4 and 5. Small saturable reactors 173 interconnect diacs 300 and 301 for pulse shaping purposes and firing circuit isolating capacitors 174 are connected between the juncture of saturable reactors 173 and the power supply terminals 15 and 16 as shown in FIGURE 11. Commutation circuit means are connected in circuit relationship with power diac devices 300 and 301 for commutating each of them off in sequence and thus returning each to its blocking condition and are comprised by commutating capacitor 18, inductor 19 and commutating diacs 302 and 303 connected in a circuit relationship similar to the connection of diacs 300 and 301. Since these commutation circuit means are identical in construction and operation to the commutation circuit means described previously, they will not be described again in detail.

In order to turn on power diac device 300 and render it conductive, a first load current firing circuit is provided which is comprised by a pulsing capacitor 304 connected in parallel circuit relationship with a resistor 305 and a snap action switch turn-on controlled conducting means 306. This snap action turn-on control conducting means may comprise a smaller rated signal diac device mentioned above, a Shockley diode, or one of the bi-directional low current rated diode devices manufactured and sold by the Hunt Electronics Company and known as a Hunt diode. The snap action switch 306 is similar to the diac device 300 in many of its characteristics; however, it will breakdown in an avalanche manner and be rendered fully conductive as long as current through switch 306 exceeds 50 milliamperes upon the application of a sufficiently high potential across the device. When thus fired, the rate of buildup of the firing potential, that is, $dv/dt$, is not important. The snap action controlled conducting device 306 is connected in series circuit relationship with resistors 305 and 307 and diode 308. The series circuit thus comprised is connected between terminal 15 and the juncture of diac 300 and saturable reactor 173. A coupling capacitor 309 is connected in parallel circuit relationship with snap action device 306, resistor 307 and diode 308. A PNP junction transistor 310 is connected in series circuit relationship with resistor 311 across pulsing capacitor 304. By this arrangement, conduction through PNP junction transistor 310 controls the rate of voltage built up across pulsing capacitor 304. With transistor 310 turned full on, the voltage on capacitor 304 never builds up to a value sufficient to trigger on the snap switch device 306. By varying the rate of conduction through transistor 310, the rate of voltage built up on the pulsing capacitor 304 can be controlled to control the point at which the snap switch device 306 is switched full on. Upon the snap switch device 306 being switched full on, the charge on capacitors 304 and 309 is connected in series circuit relationship between terminal 15 and the juncture of diac 300 and saturable reactor 173, driving such juncture quickly negative with respect to terminal 15. This results in the production of a sharp voltage pulse having a high $dv/dt$ across power diac device 300. As a consequence, power diac device 300 is turned on and conducts load current to load 17.

In addition to capacitors 304 and 309 and snap switch 306 and their associated components, the firing circuit for power diac 300 includes a second firing circuit for turning on diac devices 300 in a reverse direction. This occurs when the polarity of the potentials of terminal 15 and the juncture of diac 300 and saturable reactor 173 are reversed so that the juncture point is more positive than terminal 15 as to cause diac 300 to conduct in the feedback direction in a pump back mode of operation as described with relation to the circuit arrangement shown in FIGURE 4. The second firing circuit also turns on diac 300 during commutation, providing the function of commutating diode 21 of FIGURE 1.

The second firing circuit for diac 300 is a simplified circuit similar in construction and operation to the first firing circuit for diac 300 and for this reason the elements of the second firing circuit have been given the same reference numerals, but primed, as corresponding elements of the first firing circuit. This second or feedback firing circuit for diac 300 is comprised by pulsing capacitor 304', snap switch 306', resistor 305', capacitor 309', resistor 307' and diode 308'.

The second load current carrying diac 301 is also provided with a first and second firing circuit, each of which is similar in construction and operation to the firing circuit associated with diac 300. Therefore, departing from the convention heretofore established, in order not to get too many primes after a numeral, the numerals of the first firing circuit associated with diac 301 have been identified by a letter $f$ after them in order to indicate that they control turning on diac 301 during the power feedback mode of operation, and the numerals of the second firing circuit associated with diac 301 have been identified by a letter $c$ in order to indicate that they control the turning on diac 301 during the first mode of operation when power is supplied from the direct current power supply to load 17 and diac 301 serves a coasting diode function.

The commutating circuits for diacs 300 and 301 are comprised by circuits which are similar but more simplified than the circuits associated with load current carrying diacs 300 and 301. Thus, a commutating diac 302 has associated therewith a commutation firing circuit comprising elements 404 through 411 which are similar to elements 304 through 311, respectively, and the commutating firing circuit is similar in construction and operation to the first firing circuit for power diac 300. In like manner, the commutating circuit for diac 301 comprises commutating diac 303 and circuit elements 504 through 511 which are similar to elements 404 to 411, respectively, and the construction and operation of such commutation firing circuit is identical to the commutation firing circuit for commutating diac 302. The reverse firing feature obtained for load current carrying diacs 300 and 301 by elements 304' through 309' and 304c through 309c, respectively, are not employed in the commutating diac circuits since diacs 302 and 303 do not conduct in the reserve direction as SCRs 13 and 14 of FIGURE 1A do not conduct in the reverse direction.

Figure 23:
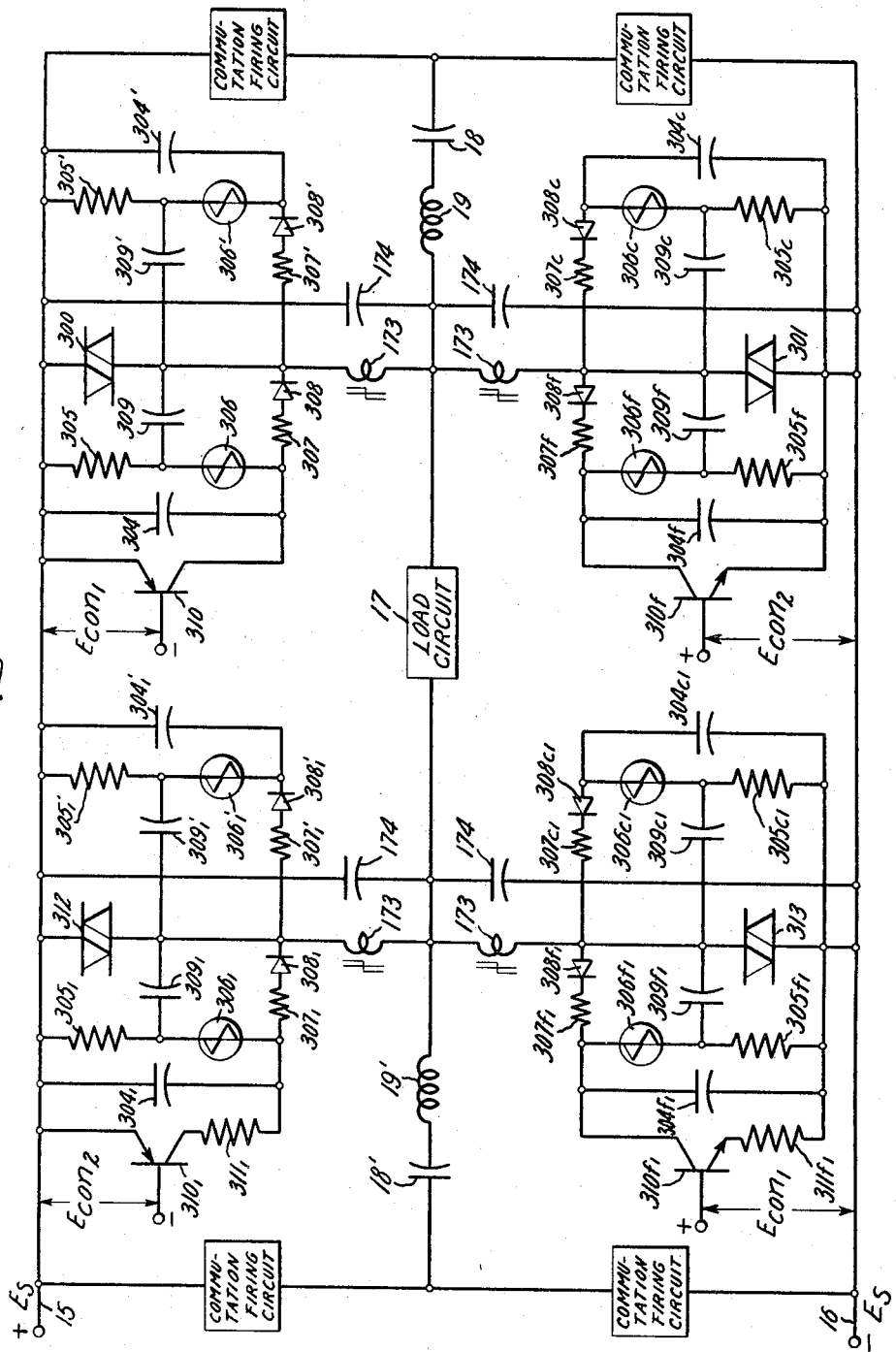
FIGURE 23 is a detailed circuit diagram of a $dv/dt$ signal source for use in controlling the operation of any of the $dv/dt$ fired inverter power circuits.

FIGURE 23 of the drawings shows a detailed circuit diagram of a $dv/dt$ signal source, especially useful in controlling the operation of any of the $dv/dt$ fired inverter power circuits, and particularly for the bridge type inverter circuits. The circuit shown in FIGURE 23 is very similar to the circuit shown in FIGURE 22 with the addition of a second set of two series connected load current conducting diacs 312 and 313 and associated commutating diacs, and the load circuit 17 being interconnected between the two sets of load current carrying diacs. The additional circuitry associated with diacs 312, 313 is given the same numerals as the respective circuitry for diacs 300, 301 with the addition of a subscript 1. The blocks designated commutating firing circuit each comprise one of the commutation firing circuits enclosed by dashed lines in FIGURE 22. It may be noted that the resistors 311 and 311f in the circuits of transistors 310 and 310f, respectively, of FIGURE 22 have been omitted in the respective circuits in FIGURE 23 although they are included within the transistor circuits of the second set of load current carrying diacs 312 and 313 to illustrate that such resistors may be used or omitted depending upon the rating of the particular transistor employed. In operation, the power circuit of FIGURE 23 functions in the same manner as the circuit of FIGURE 22, it being understood that a full-wave bridge inverter mode of operation similar to that described with relation to FIGURE 7 is obtained by simultaneously firing diametrically opposed diacs 300, 313, and subsequently, diacs 301, 312. Therefore, a further description of the construction and operation of this circuit is believed unnecessary. By reason of the use of diac load current carrying devices, the frequency of operation of the circuit shown in FIGURE 23 can be much higher than the frequency of operation of the circuit shown in FIGURE 7 since nongate turn-on devices such as diacs and $dv/dt$ fired SCRs have lower switching losses when switching such devices to their conducting state than the gate turn-on devices such as triacs and gate turn-on SCRs.

From the foregoing description, it can be appreciated that our invention provides an entire family of new and improved power circuits employing turn-on, nongate turn-off controlled conducting devices. These new and improved power circuits employ an improved commutation scheme which allows for a reduction in the size of the components employed in the circuits for a given power rating, and, hence, can be manufactured economically. The power circuits are capable of operation over a wide range of frequencies. By incorporating into these circuits, the controlled conducting devices having desired power carrying capabilities, it is possible to make them available for use over a wide range of power outputs. Further, because of the design of the circuit, they are highly efficient in operation and possess good regulation in that they minimize distortion in the square output wave shapes produced by the circuits. All of these advantages are derived from the fact that the power circuits constructed in accordance with our invention do not require that load currents flow through any commutating inductor. Hence, increased efficiency and better voltage regulation is obtained than those heretofore available in the art. Additionally, in one family of power circuits made possible by our invention, the commutation energy is recirculated thereby requiring that only minimal amounts of electricity be drawn from the power supply source to achieve commutation, making further improvements in efficiency of the circuits possible. Because of these advantages, it is possible to use the circuits at much higher frequency and to obtain reliable commutation, that is, relatively independent of load from no load to full load operating conditions. Finally, the use of bidirectional turn-on, nongate turn-off controlled conducting devices reduces the number of components in the circuits since such bidirectional device can be used in place of a unidirectional conducting device having a diode connected thereacross in an opposite polarity sense as shown in FIGURE 1.

Having described several embodiments of our new and improved power circuits in the form of time-ratio control power circuits and inverter circuits, it is believed obvious that other modifications and variations of our invention are possible in the light of the above teachings. In particular the circuits illustrated in each of the figures are not restricted to the use of the particular turn-on, nongate turn-off controlled conducting devices shown therein, but may each include triacs, diacs, gate fired SCR's, $dv/dt$ fired SCR's, or any combination thereof, it being understood that a pair of SCR's may be connected in opposite polarity parallel circuit relationship to achieve the function of a bidirectional conducting device. Further, the bidirectional power flow circuits, although operable also in a unidirectional power flow mode, can be made to be operable only in a unidirectional power flow mode by employing SCR's in place of the bidirectional load current carrying devices. Also, the commutating controlled conducting devices can be unidirectional devices in the circuits of FIGURES 4, 5, 6, 10 and still obtain bidirectional power flow.

Finally, any known filter network can be employed with the load device, if desired, to obtain a desired effect on the load current flowing through the load. It is, therefore, to be understood that changes may be made in the particular embodiment of our invention described which are within the full intended scope of the invention as defined by the appended claims.

What we claim as new and desire to secure by Letters Patent of the United States is:

1. A power circuit using turn-on, nongate turn-off controlled conducting devices including in combination:
    a pair of load current carrying turn-on, nongate turn-off bidirectional controlled conducting devices interconnected in series circuit relationship across a pair of power supply terminals which are adapted to be connected across a source of electric potential, and
    commutation circuit means comprised by a pair of series connected capacitors connected across said pair of power supply terminals in parallel circuit relationship with said pair of bidirectional conducting devices, and an inductor and a commutating turn-on, nongate turn-off bidirectional controlled conducting device connected in series circuit relationship between the juncture of capacitors and the interconnection point of said pair of load current carrying devices, said load current carrying devices each being rendered conducting during selected time intervals whereby an electric current is caused to flow in a load circuit coupled across at least one of the load current carrying devices, said commutating bidirectional controlled conducting device being rendered conducting during time intervals different from the selected time intervals for conduction of the load curent carrying devices whereby a charge on the capacitors is oscillated through a closed series circuit loop including a capacitor, inductor and the load current carrying device then conducting to thereby commutate it off.

2. A power circuit for providing a flow of direct current through a load circuit including in combination:
    a pair of load current carrying turn-on, nongate turn-off controlled conducting devices interconnected in series circuit relationship across a pair of electric power supply terminals,
    a load circuit connected in parallel circuit relationship across one of the load current carrying conducting devices, and
    commutation circuit means carrying a pair of commutating capacitors connected in series circuit relationship across the terminals of the power supply, and an inductor and a commutating turn-on, nongate turn-off bidirectional controlled conducting device connected in series circuit relationship between the juncture of the pair of commutating capacitors and the interconnection point of the two load current carrying conducting devics, said load current carrying and commutating controlled conducting device each being rendered conducting during different selected timing intervals by means of turn-on firing circuits coupled thereto, said commutating bidirectional conducting device being rendered conducting at predetermined time intervals to oscillate the charge on the commutating capacitor associated with a then conducting load current carrying device through a closed series circuit loop including said inductor and associated load current carrying device to commutate off said load current device.

3. The power circuit set forth in claim 2 wherein:
    said load current carrying devices comprise unidirectional conducting devices which upon being rendered conducting provide only a unidirectional flow of direct current in said load circuit.

4. The power circuit set forth in claim 2 wherein:
    said load current carrying devices comprise bidirectional conducting devices which upon being rendered conducting provide bidirectional flow of direct current in said load circuit.

5. A power circuit for providing a unidirectional flow of electric current through a load circuit including in combination:
    a first pair of load current carrying devices connected in series circuit relationship across the terminals of an electric power supply, a first of said first pair of devices comprising a unidirectional controlled conducting device having a commutating diode connected in parallel reverse polarity circuit relationship, and the second of said pair of devices comprising a coasting diode,
    a second pair of series connected unidirectional controlled conducting devices connected in parallel circuit relationship with said first pair of devices across the terminals of the power supply, and
    a capacitor and an inductor connected in series circuit relationship, the latter series circuit connected between the junctures of said first and second pairs of devices, said load current carrying devices each being rendered conducting during selected time intervals whereby a unidirectional flow of electric current is caused to flow in a load circuit connected in parallel circuit relationship directly across the terminals of said coasting diode.

6. The power circuit set forth in claim 5 wherein said unidirectional controlled conducting devices each comprise a gate turn-on, nongate turn-off silicon controlled rectifier.

7. The power circuit set forth in claim 5 wherein said second pair of unidirectional controlled conducting devices each comprise a $dv/dt$ fired turn-on, nongate turn-off silicon controlled rectifier, and further including:
    means coupled to said $dv/dt$ fired rectifiers to prevent simultaneous firing of both the $dv/dt$ fired rectifiers comprising said second pair of devices at the time a $dv/dt$ firing signal is impressed across one of such devices.

8. A power circuit using turn-on, nongate turn-off bidirectional controlled conducting devices for providing a bidirectional flow of direct current through a load circuit including in combination:
    a first pair of load current carrying turn-on, nongate turn-off bidirectional controlled conducting devices interconnected in series circuit relationship across a pair of terminals of an electric power supply,
    a pair of series connected commutating turn-on, nongate turn-off controlled conducting devices interconnected across the terminals of the power supply in parallel circuit relationship with said pair of load current carrying devices, and
    a capacitor and an inductor connected in series circuit relationship, the latter series circuit connected between the interconnection point of said load current carrying devices and the interconnection point of said commutating devices, said load current carrying devices being rendered conducting in each of two directions whereby a bidirectional electric current is caused to flow in a load circuit connected between one of the terminals of the power supply and the interconnection point of said load current carrying devices.

9. A power circuit for providing flow of direct current in a load circuit including in combination:
  a pair of load current carrying turn-on, nongate turn-off controlled conducting devices interconnected in series circuit relationship across the terminals of an electric power supply,
  a pair of commutating turn-on, nongate turn-off controlled conducting devices interconnected in series circuit relationship across the terminals of the power supply and in parallel circuit relationship with said load current carrying devices, and
  a capacitor and a tapped saturable core reactor connected in series circuit relationship, the capacitor end of the latter series circuit connected to the interconnection point of said pair of load current carrying devices, the saturable core reactor end of said latter series circuit connected to a terminal of a first of said commutating controlled conducting devices removed from said power supply terminals, a terminal of the second of said commutating controlled conducting devices removed from said power supply terminals connected to the tap point of said tapped saturable core reactor whereby said commutating controlled conducting devices are interconnected by means of a portion of said tapped saturable core reactor, said load current carrying devices being rendered conducting whereby a unidirectional direct current is caused to flow in a load circuit connected in parallel circuit relationship across one of said load current carrying devices upon said load current carrying devices being of a unidirectional conducting type, and a bidirectional direct current is caused to flow in the load circuit upon said load current carrying devices being of a bidirectional conducting type.

10. A power circuit using turn-on, nongate turn-off bidirectional controlled conducting devices including in combination:
  a first pair of load current carrying turn-on, nongate turn-off bidirectional controlled conducting devices interconnected in series circuit relationship across the terminals of an electric power supply,
  a second pair of load current carrying turn-on, nongate turn-off bidirectional controlled conducting devices interconnected in series circuit relationship across the terminals of the power supply and in parallel circuit relationship with the first pair of load current carrying devices,
  a load circuit connected between the interconnection point of said first pair of load current carrying devices and the interconnection point of said second pair of load current carrying devices,
  a third pair of commutating turn-on, nongate turn-off bidirectional controlled conducting devices interconnected in series circuit relationship across the terminals of the power supply and in parallel circuit relationship with said first and second pairs of load current carrying devices,
  a first capacitor and first inductor connected in series circuit relationship between the interconnection point of said first pair of load current carrying devices and the interconnection point of said third pair of commutating devices,
  a fourth pair of commutating turn-on, nongate turn-off bidirectional controlled conducting devices interconnected in series circuit relationship across the terminal of the power supply and in parallel circuit relationship with said first, second and third pairs of devices,
  commutating firing circuit means for gating-on said commutating bidirectional controlled conducting devices in either of two directions depending upon the polarity of the potential thereacross for initiating commutation off of said load current carrying bidirectional controlled conducting devices while conducting in either direction, and
  a second capacitor and a second inductor connected in series circuit relationship between the interconnection point of said second pair of load current carrying devices and the interconnection point of said fourth pair of commutating devices, said load current carrying and commutating devices being rendered conducting during selected time intervals whereby a reverse output polarity time-ratio control power circuit is obtained in a first mode of operation and a bridge inverter circuit is obtained in a second mode of operation, the particular mode of operation obtained being determined by the sequence of turning on and commutating off of the various load current carrying bidirectional conducting devices.

11. A power circuit using turn-on, nongate turn-off controlled conducting devices including in combination:
  first and second sets of two series connected load current carrying turn-on, nongate turn-off bidirectional controlled conducting devices connected across the terminals of an electric power supply,
  first and second sets of two series connected first commutating turn-on, nongate turn-off unidirectional controlled conducting devices connected in parallel with said load current carrying devices across the terminals of the power supply,
  a load circuit connected between the junctures of the series connected devices of said first and second sets of load current carrying bidirectional controlled conducting devices,
  a capacitor and an inductor connected in series circuit relationship between the junctures of the series connected devices of said first and second sets of first commutating unidirectional controlled conducting devices, and
  a set of two second commutating turn-on, nongate turn-off bidirectional controlled conducting devices connected between the juncture of the first set of load current carrying bidirectional controlled conducting devices and the juncture of the first set of first commutating unidirectional controlled conducting devices, and between the juncture of the second set of load current carrying bidirectional controlled conducting devices and the juncture of the second set of first commutating unidirectional controlled conducting devices, respectively, said load current carrying and commutating devices being rendered conducting from a source of turn-on pulses in a predetermined sequence.

12. A power circuit for providing flow of direct current through a load circuit including in combination:
  a pair of load current carrying turn-on, nongate turn-off controlled conducting devices interconnected in series circuit relationship across the terminals of a tapped electric power supply,
  a load circuit connected in parallel with one of the load current carrying controlled conducting devices, and
  a commutating circuit comprising a capacitor, an inductor and a commutating turn-on, nongate turn-off bidirectional controlled conducting device connected in series circuit relationship between the tap point of the power supply and the interconnection point of the load current carrying controlled conducting devices.

13. The power circuit set forth in claim 12 wherein:
  said load current carrying devices comprise unidirectional conducting devices which upon being rendered conducting cause flow of unidirectional direct current in the load circuit.

14. The power circuit set forth in claim 12 wherein:

said load current carrying devices comprise bidirectional conducting devices which upon being rendered conducting cause flow of bidirectional direct current in the load circuit.

15. A power circuit using turn-on, nongate turn-off bidirectional controlled conducting devices including in combination:

first and second sets of two series connected load current carrying turn-on, nongate turn-off bidirectional controlled conducting devices connected across the terminals of an electric power supply, a load circuit having inductive characteristics connected between the juncture of the first set of load current carrying devices and the juncture of the second set of load current carrying devices, first and second sets of two series connected capacitors connected across the terminals of the power supply in parallel with the two sets of load current carrying bidirectional controlled conducting devices, two sets of series connected inductors and commutating turn-on, nongate turn-off bidirectional controlled conducting devices, a first of the latter series connected circuits connected between the juncture of the first set of series connected capacitors and the juncture of the first set of load current carrying bidirectional controlled conducting devices, the second of such latter series circuits connected between the juncture of the second set of series connected capacitors and the juncture of the second set of load current carrying bidirectional controlled conducting devices, first firing circuit means for selectively rendering one set of diagonally opposed load current carrying controlled conducting devices selectively conducting in a first direction to supply electric current from the source of electric potential to the load circuit in a first load current carrying direction to thereby cause the circuit to operate in a first mode, second firing circuit means for rendering at least one commutating controlled conducting device conducting in a first direction to facilitate selective commutation off of one of said diagonally opposed conducting devices, said commutating controlled conducting device being automatically turned off at the end of the commutation off of the said one diagonally opposed device, third means for rendering a third controlled conducting device conducting in a second direction whereby load current continues to circulate through the load circuit due to energy storage within the inductive component, said first firing circuit means thereafter rendering said one diagonally opposed controlled conducting device again conducting in the first direction to initiate a new cycle of operation and turn off said second controlled conducting device from conducting in the second direction.

16. A power circuit using turn-on, nongate turn-off bidirectional controlled conducting devices including in combination:

first and second sets of two series connected load current carrying turn-on, nongate turn-off bidirectional controlled conducting devices connected in parallel circuit relationship across the terminals of an electric power supply, a load circuit having inductive characteristics connected between the juncture of the first set of load current carrying bidirectional controlled conducting devices and the juncture of the second set of load current carrying bidirectional controlled conducting devices, a capacitor, an inductor and a commutating turn-on, nongate turn-off bidirectional controlled conducting device connected in series circuit relationship across the load circuit, first firing circuit means for selectively rendering one set of diagonally opposed load current carrying controlled conducting devices selectively conducting in a first direction to supply electric current from the source of electric potential to the load circuit in a first load current carrying direction to thereby cause the circuit to operate in a first mode, second firing circuit means for rendering said commutating controlled conducting device conducting in a first direction to facilitate selective commutation off of one of said diagonally opposed conducting devices, said commutating controlled conducting device being automatically turned off at the end of the commutation off of the said one diagonally opposed device, third means for rendering a third controlled conducting device conducting in a second direction whereby load current continues to circulate through the load circuit due to energy storage within the inductive component, said first firing circuit means thereafter rendering said one diagonally opposed controlled conducting device again conducting in the first direction to initiate a new cycle of operation and turn-off said second controlled conducting device from conducting in the second direction.

17. An improved power circuit including in combination at least first and second solid state semiconductor bidirectional conducting turn-on, non-gate turn-off load current carrying controlled conducting devices operatively interconnected in series circuit relationship across a pair of power supply terminals which are adapted to be connected across an electric current power supply, a load circuit having inductive characteristics, means for connecting one terminal of said load circuit to the interconnecting point of the load current carrying controlled conducting devices, means for connecting the remaining terminal of said load circuit to at least one terminal of the power supply, commutation circuit means comprising an inductor, at least one commutating capacitor, and at least one commutating turn-on, non-gate turn-off solid state semiconductor controlled conducting device connected in series circuit relationship, said commutation circuit means being connected between the interconnection point of said pair of semiconductor load current carrying controlled conducting devices and one of the power supply terminals, first firing circuit means for selectively rendering said first conducting device selectively conducting in a first direction to supply electric current from the source of electric potential to the load circuit in a first load current carrying direction to thereby cause the circuit to operate in a first mode, second firing circuit means for rendering the commutating controlled conducting device conducting to facilitate selective commutation off of said first controlled conducting device, said commutating controlled conducting device being automatically turned off at the end of the commutation off of said first device, third means for rendering said second controlled conducting device conducting in a second direction whereby load current continues to circulate in the load circuit due to energy storage within the inductive load circuit while maintaining said second device off in the first direction, said first firing circuit means thereafter rendering said first conducting device conducting in the first direction to initiate a new cycle of operation and turn-off said second conducting device from conducting in the second direction, third firing circuit means for selectively rendering the second controlled conducting device conducting in a first direction to selectively charge the inductive component of the load circuit from energy in the load, means for enabling the second firing circuit means to render the commutating controlled device conducting to facilitate commutation off of said second device in the first direction, said commutating controlled conducting device thereafter being automatically turned off at the end of the commutation of said second device in the first direction, fourth means for rendering the first controlled conducting device conducting in a second direction to pump current from the charged inductive component back to the power supply, means for enabling the third firing circuit means to render the second controlled conducting device selectively conducting in the first direction to supply reverse polarity current flow through the load, means for enabling the second firing circuit means to selectively render the commutating controlled conducting device conductive to facilitate commutation off of said second device, and means for enabling said fourth means to render the first controlled conducting device conducting in the second direction whereby reverse polarity load current continues to circulate in the load circuit due to reverse energy storage within the inductive component while maintaining said first device off in the first direction, said third firing circuit means thereafter rendering said second device conducting in the first direction to initiate a new cycle of reverse operation and turn-off said second conducting device from conducting in the second direction.

18. A power circuit according to claim 17 wherein the first firing circuit means for rendering the first conducting device conducting in the first direction selectively charges the inductive component of the load circuit from energy in the load, the second firing circuit renders the commutating controlled conducting device selectively conducting to facilitate commutation off of said first device in the first direction, said commutating controlled conducting device thereafter being automatically turned-off at the end of the commutation off of said first device in the first direction, and the third means renders the second controlled conducting device conducting in the second direction to pump current from the charged inductive component back to the power supply.

19. A power circuit according to claim 18 wherein the means for connecting the remaining terminal of the load circuit to at least one terminal of the power supply comprises a pair of turn-on, non-gate turn-off, solid state bidirectional controlled conducting devices connected in series circuit relationship with each other across the pair of power supply terminals with remaining terminal of the load being connected to the juncture of the controlled conducting devices.

20. An improved power circuit according to claim 19 wherein the means for connecting the remaining terminal of the load to at least one terminal of the power supply comprises at least one capacitor.

21. An improved bridge power circuit including in combination first and second load current carrying series circuits connected in parallel circuit relationship across a pair of power supply terminals adapted to be connected to a source of electric potential, the first series circuit being comprised by first and second and the second series circuit being comprised by third and fourth series connected load current carrying, turn-on, non-gate turn-off, solid state semiconductor controlled bidirectional conducting devices, the first and fourth and second and third controlled conducting devices comprising diagonally-opposed legs of a power bridge circuit, a load circuit having inductive characteristics connected between the interconnection point of the first and second and the interconnection point of the third and fourth load current carrying controlled conducting devices, commutation circuit means comprising at least one inductor, at least one commutating capacitor and at least one commutating turn-on, non-gate turn-off solid state semiconductor controlled bidirectional conducting device all connected in series circuit relationship, means for connecting said commutation circuit means between the interconnection point of the first and second load current carrying controlled conducting devices and one of the power supply terminals, and for connecting said commutation circuit means between the interconnection point of said third and fourth load current carrying controlled conducting devices and one of the power supply terminals, first and fourth firing circuit means for selectively rendering the first and fourth load current carrying controlled conducting devices selectively conducting in a first direction to supply electric current from the source of electric potential to the load circuit in a first load current carrying direction to thereby cause the circuit to operate in a first mode, second firing circuit means for rendering said commutating controlled conducting device conducting in a first direction to facilitate selective commutation off of said first controlled conducting device, said second conducting device being automatically turned off at the end of the commutation off of said first device, third means for rendering said second conducting device conducting in a second direction whereby load current continues to circulate through the second and fourth devices in the load circuit due to energy storage within the inductive component while maintaining said second device off in the first direction, said first firing circuit means thereafter rendering said first controlled conducting device conducting in the first direction to initiate a new cycle of operation and turn-off said second controlled conducting device from conducting in the second direction.

22. A bridge power circuit according to claim 21 wherein said second firing circuit means includes means for selectively rendering said commutating bidirectional controlled conducting device conducting in a direction to facilitate commutation off of said fourth device, said commutating bidirectional controlled conducting device thereafter being automatically turned off at the end of the commutation of said fourth device.

23. A bridge power circuit according to claim 22 further including third firing circuit means for selectively rendering the second, load current carrying controlled conducting device conducting in the first direction, and wherein the bridge power circuit further includes fourth means for rendering the fourth controlled conducting device conducting in a second direction to selectively charge the inductive component of the load circuit with energy supplied from the load, means for enabling the second firing circuit means to render the commutating controlled device conducting in a direction to facilitate commutation off of said second device in the first direction, said commutating controlled conducting device thereafter being automatically turned off at the end of the commutation of said second device in the first direction, and first means for rendering the first device conductive in the second direction to pump current from the charged inductive component of the load back to the power supply.

24. A bridge power circuit according to claim 23 wherein the second firing circuit means renders the second controlled conducting device selectively conducting in the first direction, and the bridge power circuit further includes fifth firing circuit means for rendering the third, controlled conducting device conducting in a first direction substantially simultaneously with the second device to supply reverse polarity current flow through the load, the second firing circuit means selectively renders the commutating controlled conducting device conductive in a direction to facilitate commutation off of said second conducting device in the first direction, said commutating controlled conducting device being automatically turned off at the end of the commutation off of said second device, and first means for rendering the first controlled conducting device conducting in the second direction whereby reverse polarity load current continues to circulate in the load circuit due to reverse energy storage within the inductive component while maintaining said first device off in the first direction, said second firing circuit means thereafter rendering said second device conducting in the first direction to initiate a new cycle of reverse operation and turn-off said first conducting device from conducting in the second direction.

25. A bridge power circuit according to claim 24 wherein said second firing circuit means includes means for selectively rendering said commutating bidirectional controlled conducting device conducting in a direction to facilitate commutation off of said third device, said commutating controlled conducting device thereafter being automatically turned off at the end of the commutation of said third device.

26. A bridge power circuit according to claim 25 wherein the first firing circuit means for rendering the first conducting device conducting in the first direction selectively turns on the first device and the fifth firing circuit means includes means for rendering the third device conductive in the second direction to charge the inductive component of the load circuit from the load, the second firing circuit means renders the commutating controlled conducting device selectively conducting in the first direction to facilitate commutation off of said first device in the first direction, said commutating controlled conducting device thereafter being automatically turned-off at the end of the commutation off of said first device in the first direction, and the second means renders the second controlled conducting device conducting in the second direction to pump current from the charged inductive component back to the power supply.

References Cited

UNITED STATES PATENTS

| | | |
|---|---|---|
| 3,188,487 | 6/1965 | Hutson. |
| 3,207,974 | 9/1965 | McMurray _____ 321—45 |
| 3,280,386 | 10/1966 | Phillips _____ 317—234 |
| 3,286,155 | 11/1966 | Corey _____ 321—45 |
| 3,303,407 | 2/1967 | Depenbrock et al. ____ 321—45 |
| 3,360,712 | 12/1967 | Morgan _____ 321—43 |

FOREIGN PATENTS 945,249  12/1963  Great Britain.

JOHN F. COUCH, *Primary Examiner.*

W. SHOOP, *Assistant Examiner.*

U.S. Cl. X.R.

307—305; 321—47